(12) United States Patent
Nishimura et al.

(10) Patent No.: US 6,657,795 B2
(45) Date of Patent: Dec. 2, 2003

(54) ZOOM LENS DEVICE

(75) Inventors: Syunji Nishimura, Saitama (JP); Yukio Noguchi, Saitama (JP); Masaya Nozawa, deceased, late of Saitama (JP), by Motonori Kanaya, legal heir/representative

(73) Assignee: Fuji Photo Optical Co., Ltd., Saitama (JP)

( * ) Notice: Subject to any disclaimer, the term of this patent is extended or adjusted under 35 U.S.C. 154(b) by 228 days.

(21) Appl. No.: 09/822,384

(22) Filed: Apr. 2, 2001

(65) Prior Publication Data

US 2003/0035224 A1 Feb. 20, 2003

(30) Foreign Application Priority Data

Mar. 31, 2000 (JP) .......................................... 2000-099366
Mar. 31, 2000 (JP) .......................................... 2000-099654

(51) Int. Cl.[7] .............................................. G02B 15/14
(52) U.S. Cl. ........................ 359/699; 359/700; 359/701; 359/704; 359/706
(58) Field of Search ................................ 359/699, 700, 359/696, 697, 698; 396/72, 73, 75–80, 82, 85, 87, 91, 104

(56) References Cited

U.S. PATENT DOCUMENTS

| 5,699,199 | A | * | 12/1997 | Cho et al. .................... 359/698 |
| 5,912,772 | A | * | 6/1999 | Aoki ............................ 359/701 |
| 6,222,684 | B1 | * | 4/2001 | Nishimura ................... 359/740 |
| 6,337,952 | B1 | * | 1/2002 | Kubo ............................ 396/76 |
| 6,369,955 | B1 | * | 4/2002 | Enomoto et al. ............. 359/685 |
| 6,396,650 | B1 | * | 5/2002 | Nishimura et al. .......... 359/826 |

FOREIGN PATENT DOCUMENTS

| JP | 2-131207 | * | 5/1990 | .................. 359/696 |
| JP | 4-235511 |   | 8/1992 | |

* cited by examiner

*Primary Examiner*—Huy Mai
(74) *Attorney, Agent, or Firm*—Young & Thompson

(57) ABSTRACT

A zoom lens device includes a zoom optical system, in which front, middle and rear lens groups are set at one focal length between a wide-angle end where a focal length is short and a telephoto end where the focal length is long. Lens barrels move in first and second regions to move the front, middle and rear lens groups along an optical axis. The lens barrels, when in the first region, focus the zoom optical system with a predetermined focal length kept by maintaining an interval between the front and middle lens groups, and when in the second region, change the focal length of the zoom optical system. A combination of a cam follower pin and a cam groove effects focusing by moving the middle lens group relative to the front lens group along the optical axis when the lens barrels are in the second region.

20 Claims, 16 Drawing Sheets

ZOOM LENS DEVICE

BACKGROUND OF THE INVENTION

1. Field of the Invention

The present invention relates to a zoom lens device. More particularly, the present invention relates to a zoom lens device in which focusing at a wide-angle end is possible precisely even with a simple construction.

2. Description Related to the Prior Art

JP-A 4-235511 discloses a zoom lens device having plural lens groups, among which a focusing lens group is operated for focusing. An in-focus position for the focusing lens group is obtained according to a zoom position and an object distance, so as to move the focusing lens group to the in-focus position. A motor is driven to move the focusing lens group to the in-focus position. A rotary encoder is associated with the motor, detects a rotational angle of the motor, and causes the focusing lens group to be set precisely in the in-focus position by controlling the motor.

In the zoom lens device, the focusing lens group is moved to the in-focus position in consideration of an object distance of a particular object. It is general in the zoom lens device that an amount of moving the focusing lens group to the in-focus position is higher in positions near to a telephoto end than in positions near to a wide-angle end. According the prior art, resolving power of the rotary encoder is determined so as to obtain sufficiently high precision in positions near to the wide-angle end.

However, there occurs a problem in that the difference in the moving amount of the focusing lens group becomes remarkably high if a zoom ratio of the zoom lens device is high. The rotary encoder needs to be a type of high precision for the purpose of obtaining sufficient precision in positions near to the wide-angle end. This raises the manufacturing cost of the zoom lens device. Another problem occurs in that focusing may take long time because the moving amount of the focusing lens group becomes higher in positions near to the telephoto end.

According to a known type of the zoom lens device, focusing is effected by a separate advance type of barrel movement. There are a front lens group and a rear lens group in the zoom lens device disposed on the optical axis. The front and rear lens groups are moved forwards together for zooming. A distance between the front and rear lens groups is changed according to the separate advance type for the focusing operation.

Zooming and focusing are effected according to the separate advance type in the prior art. An interval between the front and rear lens groups requires changes, so as to increase the whole size of the zoom lens device. For example, the zoom lens device is zoomed out gradually from the telephoto end. The distance between the front and rear lens groups is raised for focusing, to maximize the distance between those at the wide-angle end. This requires the zoom lens device to have an extremely large size, because barrels and other elements in the zoom lens device need to be large.

SUMMARY OF THE INVENTION

In view of the foregoing problems, an object of the present invention is to provide a zoom lens device in which precise focusing at a wide-angle end is possible even with a simple construction.

Another object of the present invention is to provide a zoom lens device having a relatively small size, and also in which precise focusing is possible.

In order to achieve the above and other objects and advantages of this invention, a zoom lens device has a zoom lens device includes a zoom optical system, having at least first and second lens groups, for being set at one focal length between a wide-angle end where a focal length is short and a telephoto end where the focal length is long. A lens barrel moves in first and second regions to move the first and second lens groups along an optical axis, the lens barrel, when in the first region, focusing the zoom optical system with a predetermined focal length kept by maintaining an interval between the first and second lens groups, and when in the second region, changing the focal length of the zoom optical system. A first lens moving mechanism effects focusing by moving the first lens group relative to the second lens group along the optical axis when the lens barrel is in the second region.

Furthermore, a zoom motor moves the lens barrel. A focusing motor drives the first lens moving mechanism. A controller controls the zoom motor and the focusing motor, the controller, when the zoom optical system is set at the predetermined focal length, driving the zoom motor for focusing, and when the zoom optical system is offset from the predetermined focal length, driving the focusing motor for focusing.

The reference focal length is a focal length at the wide-angle end.

Furthermore, a rangefinding unit measures object distance. A memory stores set position information of which an address is a combination of the object distance and the focal length. The controller reads the set position information from the memory according to the object distance and the focal length, and drives the zoom motor or the focusing motor according to the set position information.

The lens barrel effects focusing operation by rotating from a starting point of the first region toward an ending point of the first region, the starting point being at the wide-angle end, and the ending point being continuous with the second region.

Furthermore, a zoom position detector detects the focal length where the zoom optical system is set.

Furthermore, a stationary barrel supports the lens barrel in a rotatable and slidable manner. At least one movable barrel is contained in the lens barrel, movable along the optical axis, for supporting the zoom optical system in a movable manner. At least one cam mechanism is actuated by rotation of the lens barrel, for moving the movable barrel along the optical axis.

The cam mechanism has first and second cam regions associated with respectively the first and second regions.

The cam mechanism includes a cam follower pin formed to project from the movable barrel. A cam groove is formed in the lens barrel, engaged with the cam follower pin, caused by rotation of the lens barrel to push the cam follower pin along the optical axis, the cam groove having first and second groove portions, the first groove portion constituting the first cam region, the second groove portion constituting the second cam region, and being inclined relative to a rotational direction of the lens barrel at a gradient higher than the first groove portion.

Furthermore, a first measuring unit measures a first shifting amount of the first lens moving mechanism. A second measuring unit measures a second shifting amount of the lens barrel. The controller stops the zoom motor or the focusing motor when respectively the first or second shifting amount comes up to a value associated with the set position information.

The zoom position detector includes a contact brush movable together with the zoom optical system. A contact point pattern includes plural contact points, is disposed inside the stationary barrel to extend along the optical axis, contacted by the contact brush, for generating a signal for representing the focal length.

The lens barrel helically moves in the stationary barrel, and the movable barrel slides in the lens barrel. Upon powering, the controller drives the zoom motor to move the lens barrel and the movable barrel to a position associated with the wide-angle end from a collapsed position disposed in a rear in the stationary barrel.

The first lens group is disposed behind the second lens group. The first lens group includes third and fourth lens groups, the fourth lens group is disposed behind the third lens group, and driven by the focusing motor.

According to another aspect of the invention, a zoom lens device includes a zoom optical system, having at least first and second lens groups, for being set at one focal length between a wide-angle end where a focal length is short and a telephoto end where the focal length is long. A lens barrel rotates in first and second regions to zoom and focus the zoom optical system, the first and second regions being defined by dividing a section to move the zoom optical system from the wide-angle end to the telephoto end, the lens barrel, when in the first region, moving the first and second lens groups with an interval between the first and second lens groups kept unchanged, and when in the second region, moving the first and second lens groups with a change in the interval.

The lens barrel, when in the first region, focuses the zoom optical system with the focal length of the wide-angle end unchanged, and when in the second region, changes the focal length and focuses the zoom optical system.

The lens barrel, when in the second region, rotates toward the telephoto end for zooming, then the lens barrel rotates toward the wide-angle end in a predetermined focusing region for focusing, and the first lens group moves at a lower speed when the lens barrel is in the focusing region than the lens barrel rotates toward the telephoto end, so as to increase an interval between the first and second lens groups.

In a preferred embodiment, a zoom lens device includes at least first and second lens groups movable along an optical axis. A first lens barrel moves along the optical axis between a wide-angle end and a telephoto end, to zoom and focus the first and second lens groups. A first lens moving mechanism is actuated while the first lens barrel moves between the wide-angle end and a predetermined zoom position, for moving the first lens group together with the first lens barrel, and actuated while the first lens barrel moves between the predetermined zoom position and the telephoto end, for moving the first lens group relative to the first lens barrel for zooming. A second lens moving mechanism is actuated while the first lens barrel moves between the wide-angle end and the predetermined zoom position, for moving the second lens group together with the first lens barrel, and actuated while the first lens barrel moves between the predetermined zoom position and the telephoto end, for moving the second lens group relative to the first lens barrel for zooming and focusing.

Furthermore, a stationary barrel is disposed outside the first lens barrel, coupled helically with the first lens barrel, for keeping the first lens barrel movable along the optical axis in rotation. A second lens barrel is disposed inside the first lens barrel, coupled helically with the first lens barrel, for sliding along the optical axis relative to the first lens barrel when the first lens barrel rotates. A third lens barrel is disposed inside the second lens barrel, for sliding along the optical axis together with the first lens barrel. A first lens holder is contained in the third lens barrel in a slidable manner, for holding the first lens group. A second lens holder is contained in the third lens barrel in a slidable manner, for holding the second lens group.

The first lens moving mechanism includes a groove, formed in the first lens holder, for extending along the optical axis, the groove having a first end located on a side of the telephoto end, and a second end located on a side of the wide-angle end. A projection is formed to project from the second lens holder, engageable with the first and second ends, for being engaged with the first end when the second lens holder is moved toward the telephoto end, to slide the first lens holder in the third lens barrel, and for being engaged with the second end when the second lens holder is moved toward the wide-angle end, to slide the first lens holder in the third lens barrel. A retention mechanism retains the first lens holder in the third lens barrel when the projection is between the first and second ends.

The second lens moving mechanism includes a cam groove formed in the first lens barrel. A cam pin is formed to project from the second lens holder, disposed through the third lens barrel and the second lens barrel, for being engaged with the cam groove.

The cam groove includes a first portion for extending in a rotational direction of the first lens barrel to set the cam pin free from being shifted, the first portion operating when the first lens barrel moves between the wide-angle end and the predetermined zoom position. A second portion extends crosswise to the rotational direction of the first lens barrel to shift the cam pin, the second portion operating when the first lens barrel moves between the predetermined zoom position and the telephoto end.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
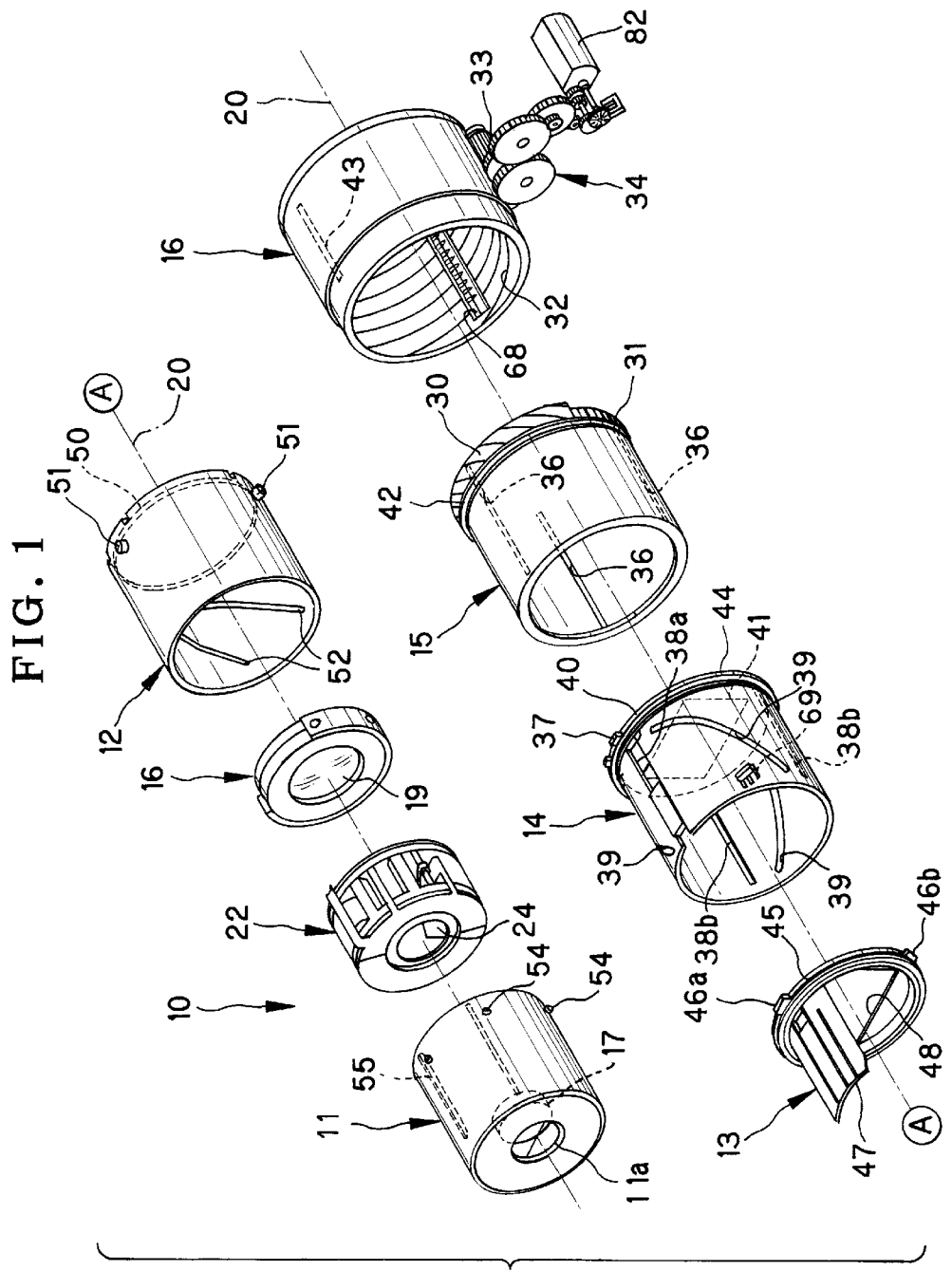
FIG. 1 is an exploded perspective illustrating a zoom lens device.
Figure 2:
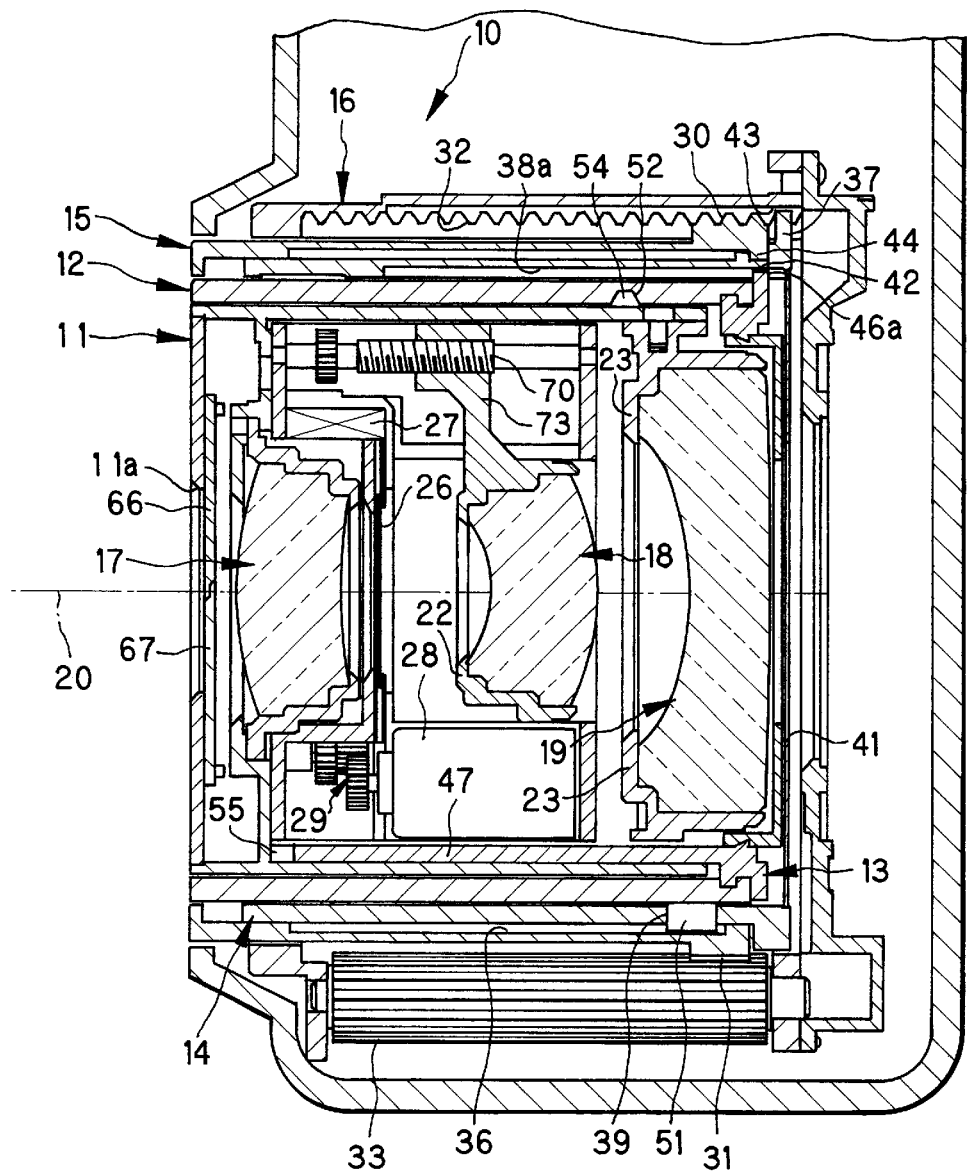
FIG. 2 is a cross section illustrating the zoom lens device set in a collapsed position.
Figure 3:
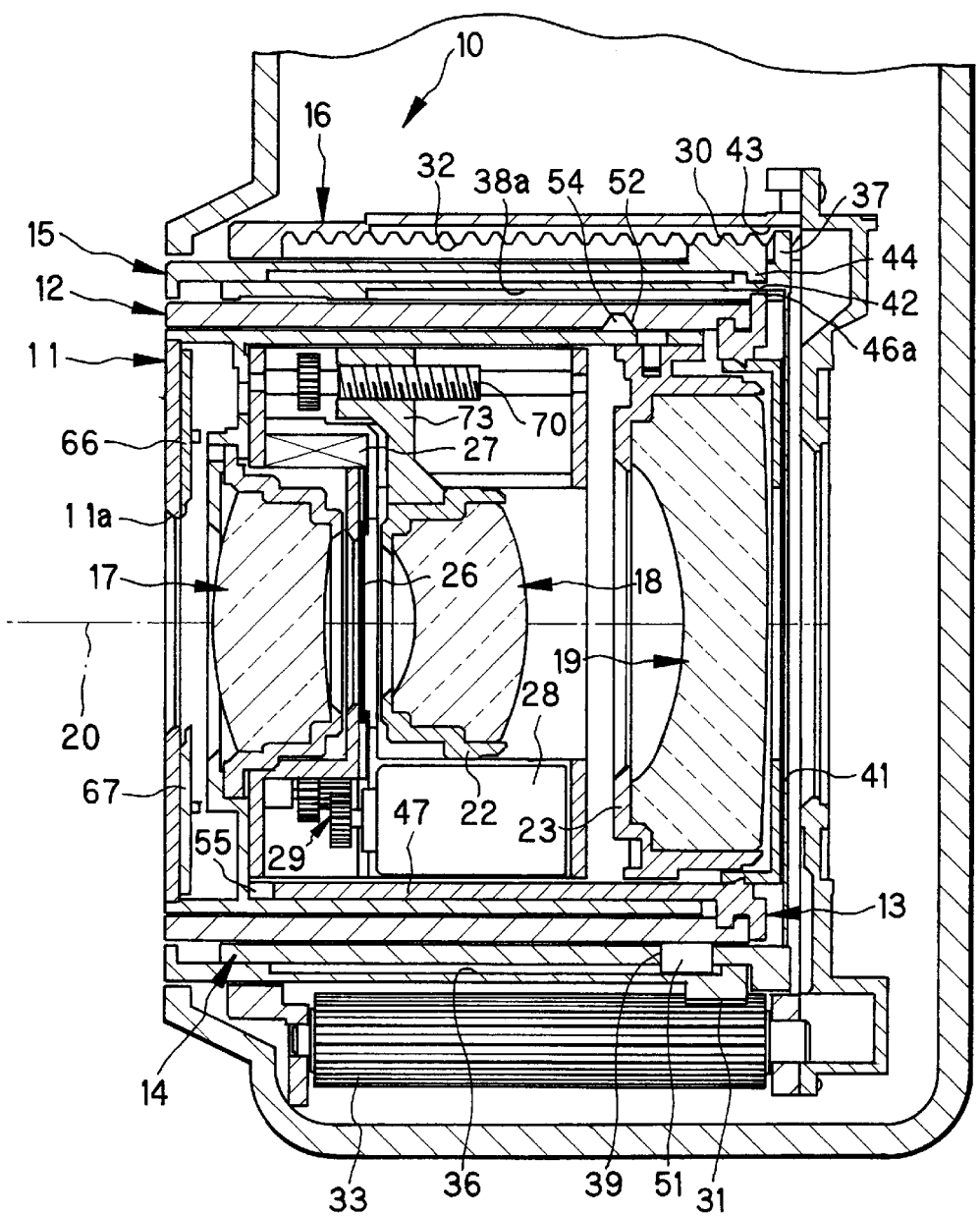
FIG. 3 is a cross section illustrating the zoom lens device set in a wide-angle end ready position.

In FIGS. 1–4, a zoom lens device 10 is illustrated, and includes a movable barrel 11, an inner intermediate barrel 12, a rectilinear key frame 13, a rectilinear barrel 14, an outer intermediate barrel 15 and a stationary barrel 16. There are a middle lens group 18 as a first lens group, a front lens group 17 as a second lens group, and a rear lens group 19 as a third lens group, which constitutes a zoom optical system accommodated in the movable barrel 11, and moved in a direction of an optical axis for zooming.

The movable barrel 11 accommodates a front lens holder for the front lens group 17, a middle lens holder 22 for the middle lens group 18 and a rear lens holder 23 for the rear lens group 19, and is movable relative to the inner intermediate barrel 12 in parallel with the optical axis rectilinearly. The inner intermediate barrel 12 is rotated by rotation of the outer intermediate barrel 15, and at the same time moved along the optical axis. The outer intermediate barrel 15 rotates relative to the stationary barrel 16, and moves along the optical axis at the same time.

The front lens group 17 is positioned inside the movable barrel 11 and the nearest to a photographic field. The middle lens holder 22 is fixedly secured to the rear of the front lens group 17 inside the movable barrel 11, and provided with a shutter block 24, the middle lens group 18 and a middle lens moving assembly. The shutter block 24 includes a shutter mechanism 26 and a shutter actuator 27. The shutter mechanism 26 is disposed behind the front lens group 17. The shutter actuator 27 drives the shutter mechanism 26.

To move the middle lens group 18, the middle lens moving assembly has a moving mechanism 29 and a guide mechanism. The guide mechanism guides the middle lens group 18 in parallel with the optical axis movably between the shutter mechanism 26 and the rear lens holder 23. The moving mechanism 29 includes a focusing motor 28 and a gear train. The focusing motor 28 is driven to move the middle lens group 18 in the direction defined by the guide mechanism. The focusing motor 28 for the middle lens group 18 operates for the purpose of focusing at the time of a zoom position different from a wide-angle end, and the purpose of movement from a collapsed position to the wide-angle end. The rear lens holder 23 is secured fixedly to the inside of the movable barrel 11 behind the middle lens holder 22.

The outer intermediate barrel 15 is disposed in the stationary barrel 16. A rear portion of the outer intermediate barrel 15 has a male helicoid thread 30 and gear teeth 31. The male helicoid thread 30 constitutes a first helicoid mechanism, which also has a female helicoid thread 32, disposed inside the stationary barrel 16, and helically coupled with the male helicoid thread 30. A gear 33 of an axially long shape is associated with the stationary barrel 16, and meshed with the gear teeth 31. The gear 33 extends in parallel with the optical axis and remains in mesh with the gear teeth 31 even the outer intermediate barrel 15 is moved along the optical axis. A drive unit 34 drives the gear 33. The drive unit 34 operates for the purpose of respectively moving the movable barrel 11, the inner intermediate barrel 12 and the outer intermediate barrel 15, and is constituted by a zoom motor and a gear train. A guide groove 36 of a cam mechanism is formed in an inner wall of the outer intermediate barrel 15, and transmits rotation to the inner intermediate barrel 12.

The rectilinear barrel 14 has a ring-shaped groove 44, a key projection 37, rectilinear grooves 38a and 38b and a first cam groove 39 in the cam mechanism. A mask plate 40 is secured to the rear of the rectilinear barrel 14. The ring-shaped groove 44 is formed outside the rectilinear barrel 14 and disposed close to the rear end. A ring-shaped ridge 42 projects from an inner surface of the outer intermediate barrel 15 and disposed close to the rear end. The ring-shaped groove 44 receives insertion of the ring-shaped ridge 42. So the rectilinear barrel 14 is supported in a manner rotatable about an optical axis 20 relative to the outer intermediate barrel 15, and movable together with the outer intermediate barrel 15 in parallel with the optical axis 20. A rectilinear groove 43 is formed in the inner surface of the stationary barrel 16. The key projection 37 is disposed to extend behind the outer intermediate barrel 15, and inserted in the rectilinear groove 43, so as to prevent the rectilinear barrel 14 from rotating relative to the stationary barrel 16.

The rectilinear grooves 38a and 38b operate to prevent the rectilinear key frame 13 from rotating. The first cam groove 39 operates for moving the inner intermediate barrel 12 along the optical axis 20 forwards and backwards. A mask opening 41 of a quadrilateral shape is formed in the mask plate 40 for passage of object light. The mask portion around the mask opening 41 blocks harmful light behind the outer intermediate barrel 15 in passing object light.

The rectilinear key frame 13 includes a ring-shaped groove 45, key projections 46a and 46b and an arc-shaped key plate 47. The key projection 46a projects from the periphery of the rectilinear key frame 13, is engaged with the rectilinear groove 38a in the rectilinear barrel 14, and prevents the rectilinear key frame 13 from rotating. The key projection 46b has a different width than the key projection 46a, is engaged with the rectilinear groove 38b to prevent the rectilinear key frame 13 from rotating. The arc-shaped key plate 47 protrudes in parallel with the optical axis 20, and prevents the movable barrel 11 from rotating. A mask opening 48 is formed in a rear mask wall of the rectilinear key frame 13. A portion of the rear mask wall around the mask opening 48 shields the rear of the inner intermediate barrel 12 from harmful light which is not object light.

The inner intermediate barrel 12 has a ring-shaped ridge 50, a cam follower pin 51 and a second cam groove 52. The ring-shaped ridge 50 is engaged with the ring-shaped groove 45 of the rectilinear key frame 13 in a rotatable manner. The cam follower pin 51 is inserted through the first cam groove 39 of the rectilinear barrel 14, and engaged with the guide groove 36 of the outer intermediate barrel 15. The second cam groove 52 operates to move the movable barrel 11 in parallel with the optical axis 20.

A cam follower pin 54 and a key ridge 55 project from the movable barrel 11. The cam follower pin 54 is engaged with the second cam groove 52 in the inner intermediate barrel 12. The key ridge 55 projects from the inner face of the movable barrel 11, is engaged with the arc-shaped key plate 47 of the rectilinear key frame 13, and prevents the movable barrel 11 from rotating. A length of the arc-shaped key plate 47 in parallel with the optical axis 20 is sufficient for keeping engagement with the key ridge 55 even when the movable barrel 11 moves forwards relative to the inner intermediate barrel 12. Cutouts are formed in the periphery of the middle lens holder 22 and the rear lens holder 23 for receiving entry of the arc-shaped key plate 47.

At the time of zooming, a zoom motor 82 rotates. The rotation is transmitted by the gear 33 to the gear teeth 31 of the outer intermediate barrel 15. The outer intermediate barrel 15 moves along the optical axis 20 in rotation according to a lead of the male and female helicoid threads 30 and 32. The rectilinear barrel 14 moves together with the outer intermediate barrel 15 in a state prevented from rotating in the stationary barrel 16. Rotation of the outer intermediate barrel 15 is transmitted to the inner intermediate barrel 12, so the inner intermediate barrel 12 moves and also rotates according to a shift of the first cam groove 39 in parallel with the optical axis 20. The rectilinear key frame 13 moves with the inner intermediate barrel 12 in parallel with the optical axis 20 in a state prevented from rotating in the rectilinear barrel 14. The movable barrel 11 rectilinearly moves according to a shift of the second cam groove 52 along the optical axis 20 in a state prevented from rotating relative to the rectilinear key frame 13. Therefore, the lens groups 17–19 move together in parallel with the optical axis 20 by an amount of a sum of component amounts of moving the outer intermediate barrel 15, the inner intermediate barrel 12 and the movable barrel 11.

Figure 5A:
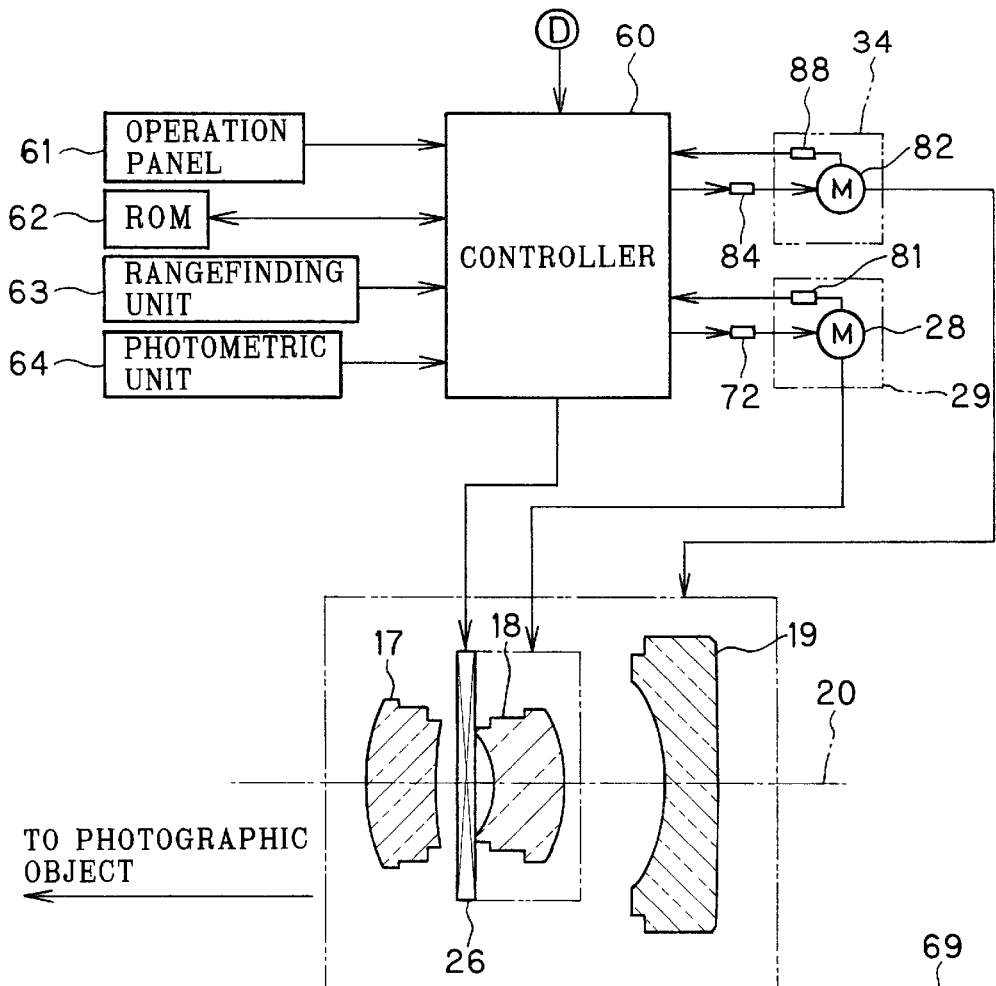
FIG. 5A is a block diagram illustrating circuits in the zoom lens device with its lens groups.
Figure 5B:
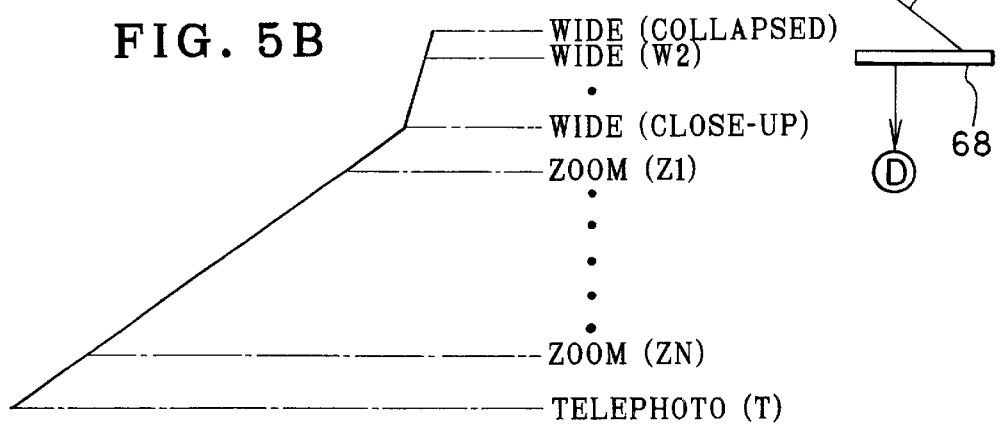
FIG. 5B is a graph illustrating zoom positions associated with a shape of a cam groove.

In FIG. 5, the camera has a controller 60. There are an operation panel 61, a ROM 62, a rangefinding unit 63 and a photometric unit 64 connected to the controller 60. The operation panel 61 includes a power switch, a zoom button and a shutter release button. When the power switch is turned off, the controller 60 responsively drives the zoom motor 82, and moves the zoom optical system to the collapsed position where the movable barrel 11, the inner intermediate barrel 12 and the outer intermediate barrel 15 are contained in the camera body. See FIG. 2. When the power switch is turned on, the controller 60 responsively drives the focusing motor 28, and moves the middle lens group 18 to an original position the closest to the front lens group 17. See FIG. 3. The zoom lens device 10 is set at the wide-angle end ready position upon turning on of the power switch.

A lens barrier mechanism is incorporated in the movable barrel 11 in front of the front lens group 17. The lens barrier mechanism includes lens barrier plates 66 and 67 and a transmission structure. The lens barrier plates 66 and 67 open and close a photographing opening 11a of the movable barrel 11. The transmission structure moves the lens barrier plates 66 and 67 in response to rotation of the focusing motor 28 for the middle lens group 18.

Figure 4:
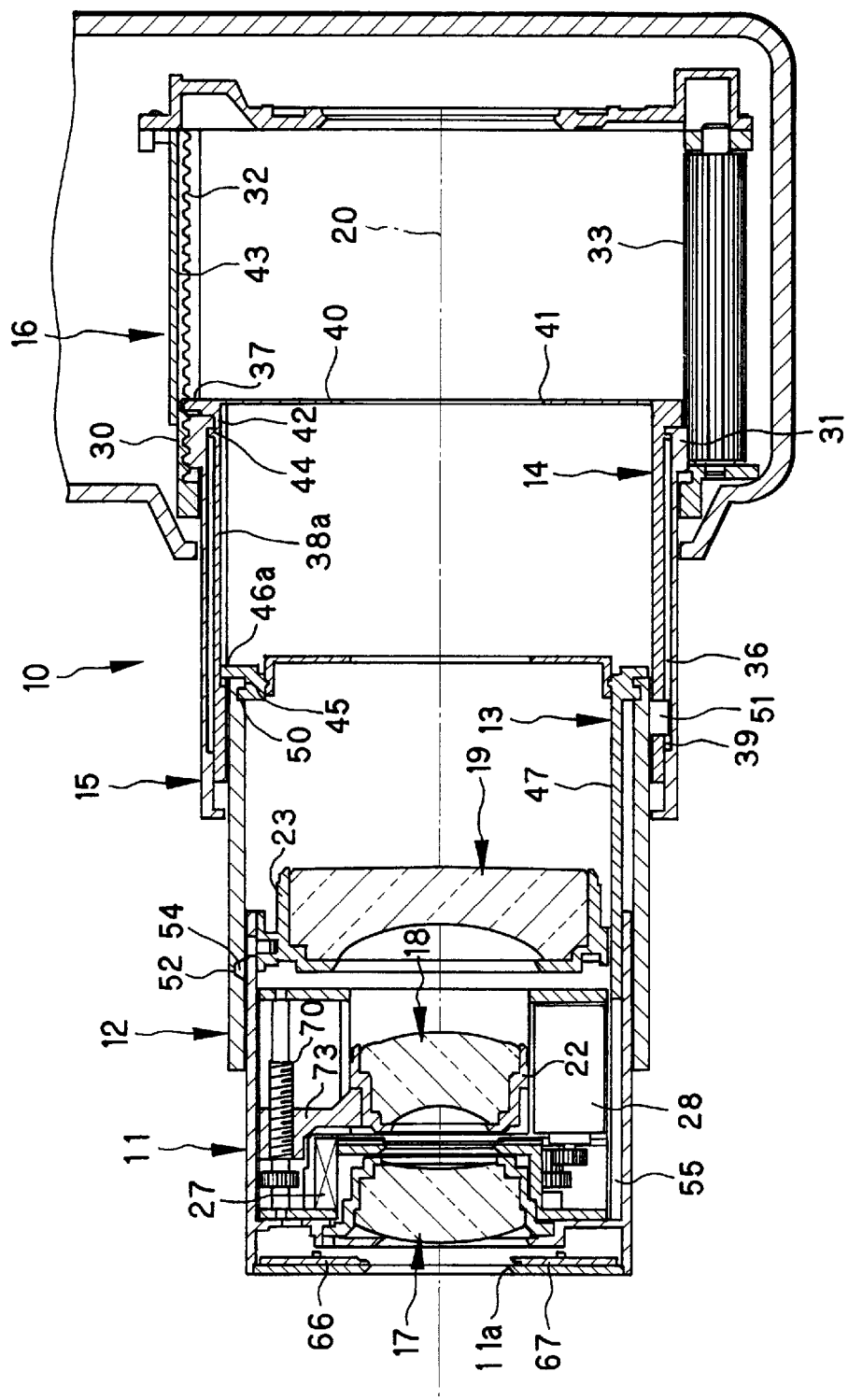
FIG. 4 is a cross section illustrating the zoom lens device set in a telephoto position.

When the zoom button is operated in the state of the wide-angle end, then the zoom motor 82 is driven to move forwards the movable barrel 11, the inner intermediate barrel 12 and the outer intermediate barrel 15 to zoom the optical system toward the telephoto end, which is illustrated in FIG. 4. A clutch is incorporated in a barrier mechanism, and has a tension plate having a portion protruding from the periphery of the middle lens holder 22. When the inner intermediate barrel 12 is between the collapsed position and the wide-angle position, a portion of the arc-shaped key plate 47 of the rectilinear key frame 13 is disposed directly outside the middle lens holder 22. The tension plate is partially pressed by the arc-shaped key plate 47 in an inward direction. A gear is associated with the tension plate. The tension plate, when pushed, moves to a transmission position to transmit rotation of the focusing motor 28 to a barrier mechanism. When the inner intermediate barrel 12 is set between the wide-angle and telephoto ends, the arc-shaped key plate 47 comes to a position offset from the middle lens holder 22. The tension plate is moved by a spring to a release position where rotation of the focusing motor 28 is not transmitted to the barrier mechanism. Thus, the barrier mechanism is disconnected from the focusing motor 28. Both the lens barrier plates 66 and 67 are kept in the open position.

When the power switch is turned off, the controller 60 drives the zoom motor 82 to return from a zoom position to the collapsed position. Thus, the tension plate moves to its transmission position. Afterwards, the controller 60 drives the focusing motor 28 to move the middle lens group 18 to a position the closest to the focal plane. Rotation of the focusing motor 28 also causes the lens barrier plates 66 and 67 to move to the closed position.

The zoom lens device 10 is a step zoom type, in which only a limited number of zoom positions are predetermined and used within a range between the wide-angle and telephoto ends. There is a zoom position detector constituted by a contact point pattern 68 and a contact brush 69. The contact point pattern 68 is a code plate disposed on an inner face of the stationary barrel 16. The contact brush 69 is secured to the rectilinear barrel 14. When the contact brush 69 becomes disposed in a position corresponding to each zoom position, the contact point pattern 68 sends a code signal to the controller 60. According to the code signal, the controller 60 determines a zoom position. After the zooming operation, driving of the zoom motor 82 is stopped to determine the zoom position finally.

The contact brush 69 is secured to the rear end of the rectilinear barrel 14, and contacts the contact point pattern 68 behind the outer intermediate barrel 15.

Note that, instead of the contact point pattern 68 and the contact brush 69, a zoom position detector may be constituted by a potentiometer, which outputs a potential of a continuously changing value for the purpose of determining each of the plural zoom positions.

Figure 6:
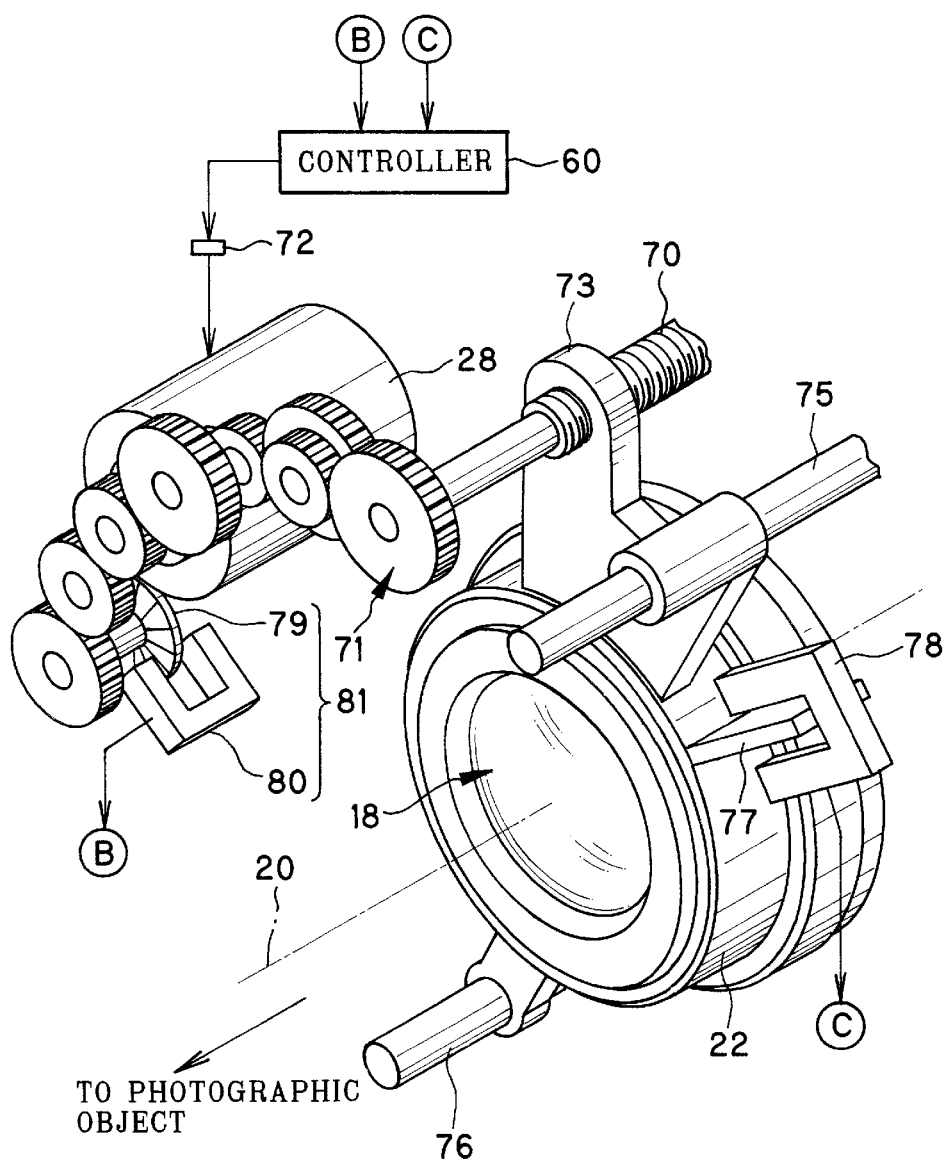
FIG. 6 is a perspective illustrating a middle lens group and relevant elements for driving the same.

Operation of shifting the focus is different between the wide-angle end and zoom positions other than the wide-angle end. For zoom positions not being the wide-angle end, the middle lens group 18 is moved along the optical axis 20 for focusing. In FIG. 6, a gear train 71 operates in response to rotation of the focusing motor 28, and causes a screw rod 70 to rotate. A driver 72 is connected with the focusing motor 28 for the controller 60 to control the focusing motor 28. A nut portion 73 receives the screw rod 70 and helically coupled with the same. The nut portion 73 is formed to project from the middle lens holder 22 that supports the middle lens group 18. Two guide rods 75 and 76 support the middle lens holder 22 in a slidable manner along the optical axis 20, and also prevents the middle lens holder 22 from rotating. When the screw rod 70 rotates, the middle lens holder 22 slides. Note that there is a spring (not shown) for biasing the middle lens group 18 either forwards or backwards along the optical axis 20.

A moving amount of the middle lens group 18 is detected by a moving amount position detector, which is constituted by an original position detector and a rotational angle detector. The original position detector includes an intercepting plate 77 and a photo sensor 78. The intercepting plate 77 is secured to the middle lens holder 22. The photo sensor 78 is a transmission type and detects a front edge of the intercepting plate 77. When zooming is completed, the middle lens holder 22 with the middle lens group 18 is moved back to an original position. The photo sensor 78 is disposed on a side of a photographic field in such a manner that, when the middle lens group 18 is in the original position, an edge of the intercepting plate 77 on the photographic field side is detected by the photo sensor 78.

The rotational angle detector consists of a rotary encoder 81, which includes an impeller 79 and a photo sensor 80. The impeller 79 has a plurality of slits. The photo sensor 80 is a transmission type and detects passage of each slit. The impeller 79 is connected with an element in the gear train 71, and rotates when the focusing motor 28 rotates. The photo sensor 80 detects slits when the output shaft of the focusing motor 28 rotates, and sends a detection signal to the controller 60 in the camera. The controller 60 counts the detection signal from the photo sensor 80, and obtains an amount of moving the middle lens group 18.

Figure 7:
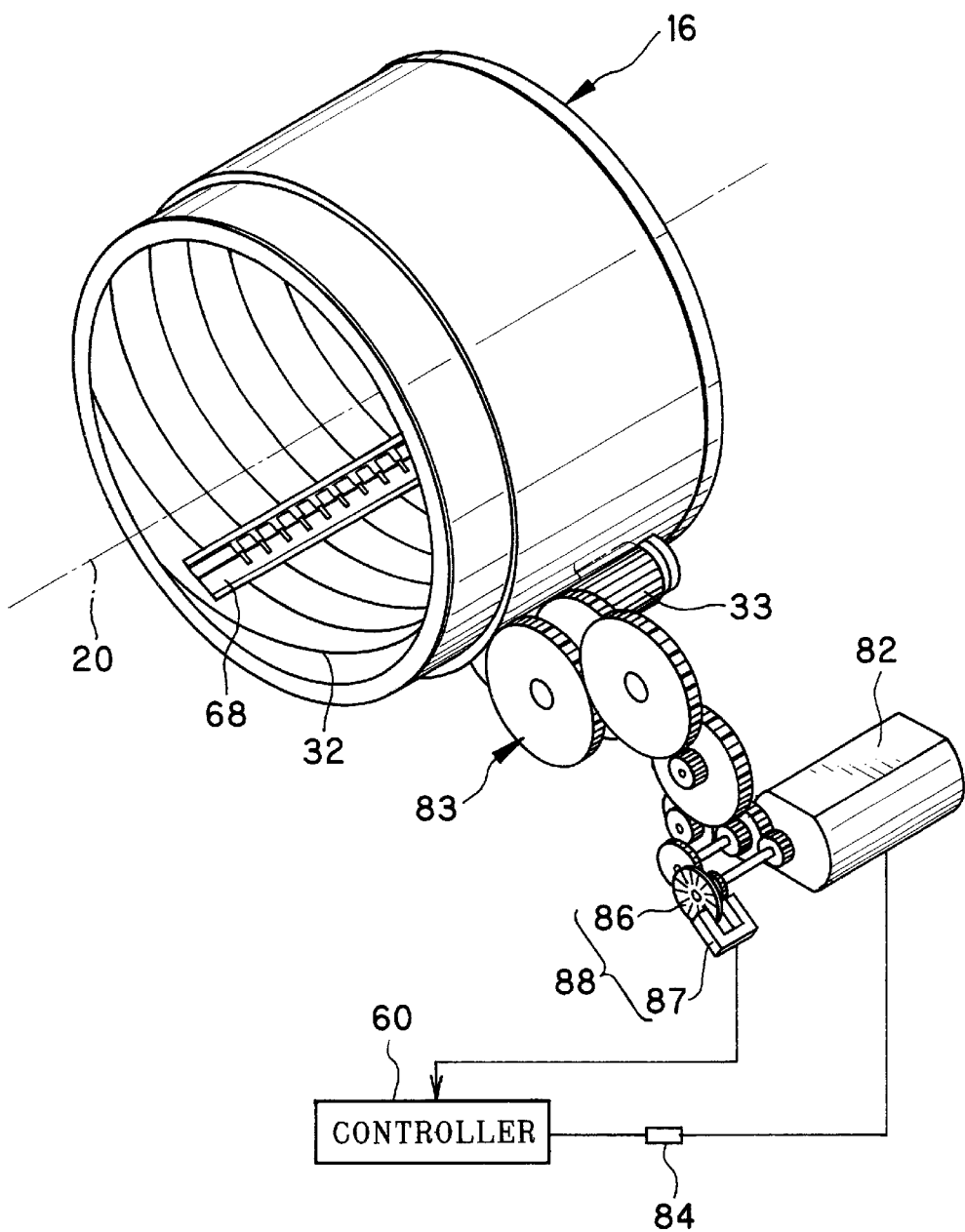
FIG. 7 is a perspective illustrating a stationary barrel and elements for driving an outer intermediate barrel in FIGS. 1-4.

At the wide-angle end, the zoom motor 82 is driven for focusing without driving the focusing motor 28. In FIG. 7, a gear train 83 transmits rotation of the zoom motor 82 to the gear 33. A driver 84 is connected between the zoom motor 82 and the controller 60 for control of the zoom motor 82. A rotary encoder 88 is connected to an output shaft of the zoom motor 82, and includes an impeller 86 and a photo sensor 87. The controller 60 controls the rotary encoder 88, and determines a rotational angle of the zoom motor 82 according to a signal obtained by the photo sensor 87.

Figure 8:
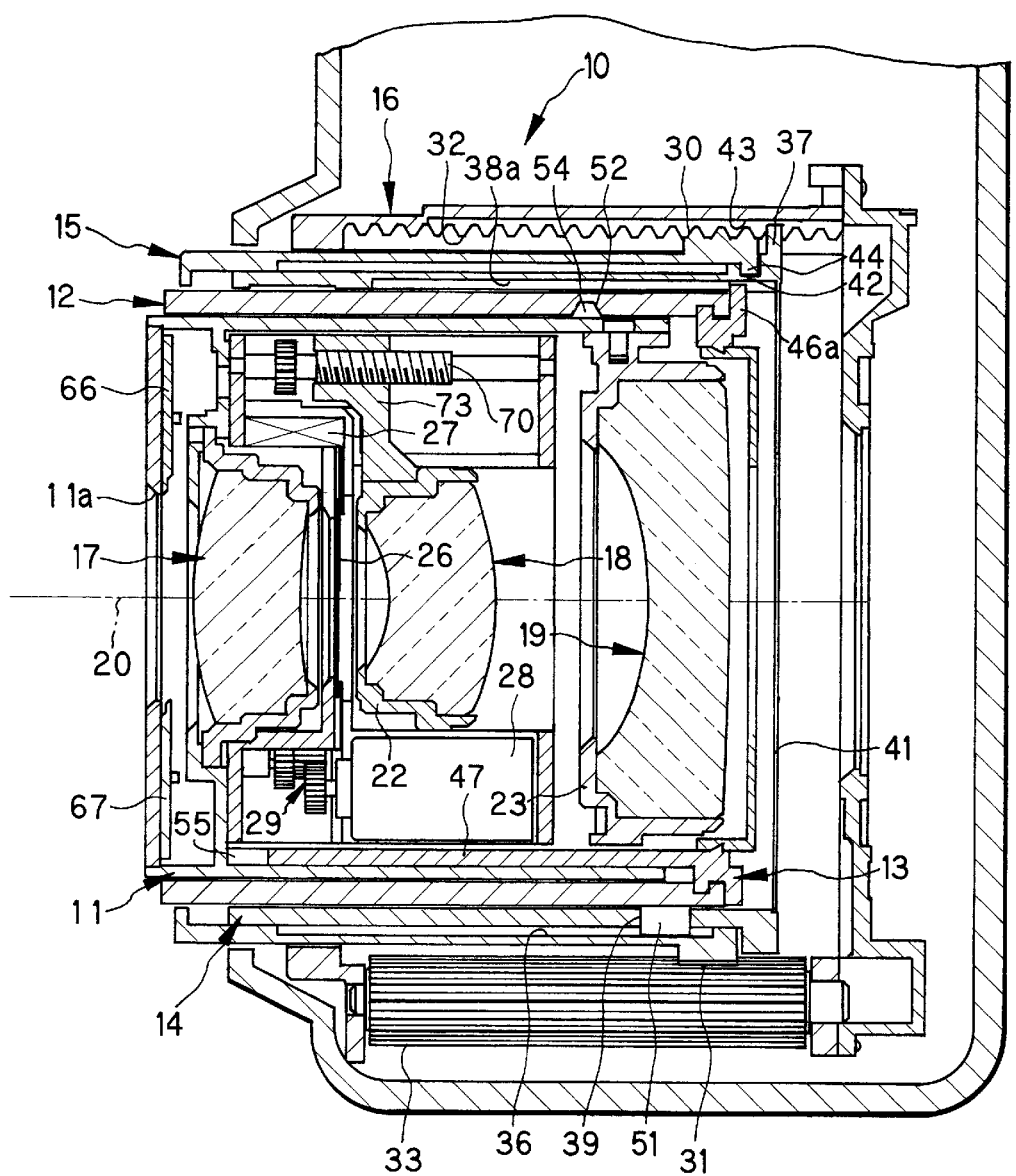
FIG. 8 is a cross section illustrating the zoom lens device set in a wide-angle end W2 in an infinity focused state.
Figure 9:
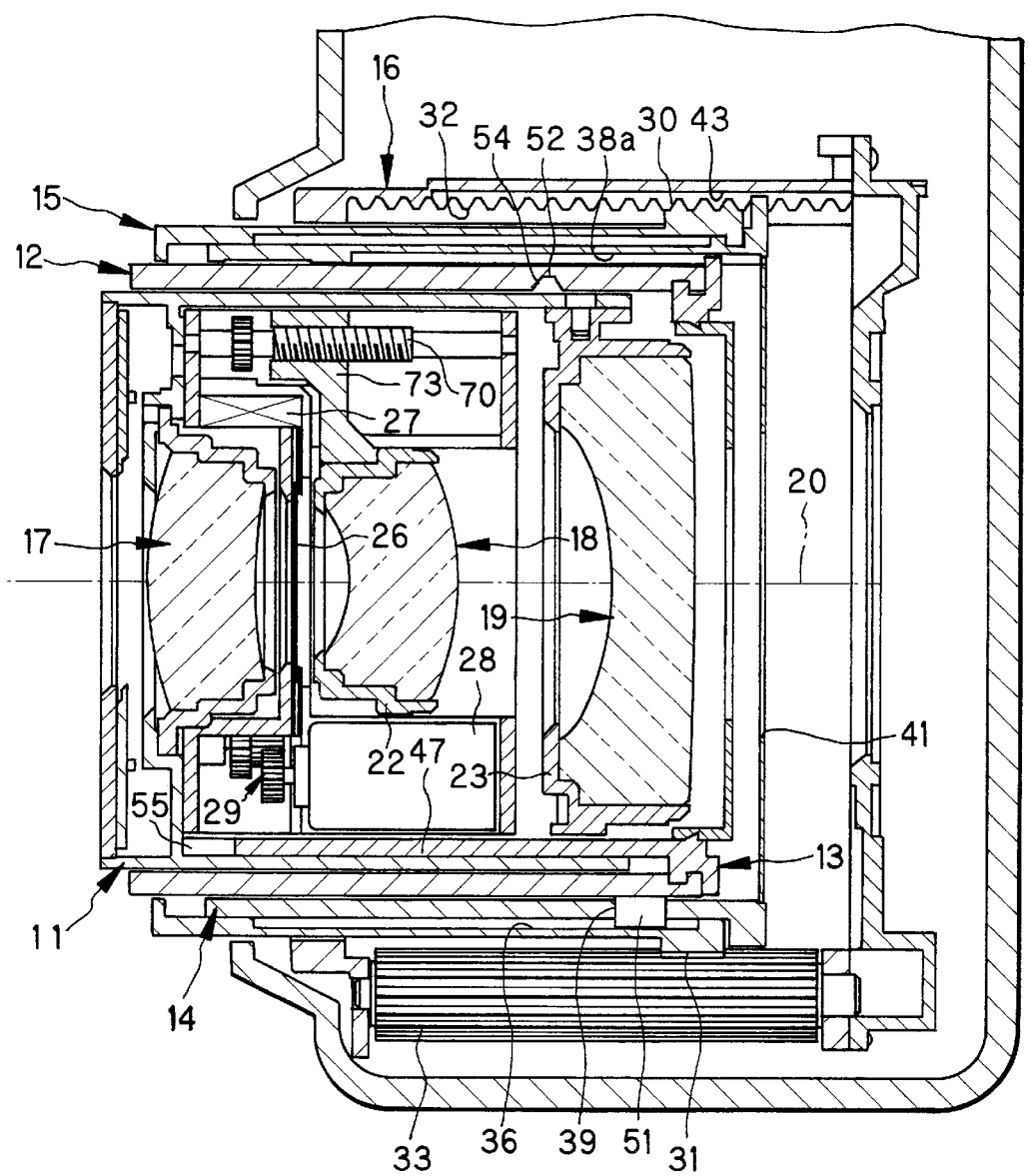
FIG. 9 is a cross section illustrating the zoom lens device set in a wide-angle end and in a close-up focused state.

In FIG. 8, a state set at the wide-angle end is depicted. The zoom optical system is focused to an infinite far distance. If focusing on to an object at a near distance is desired in a close-up manner, the zoom motor 82 is driven at a predetermined amount. In FIG. 9, the lens groups 17–19 are moved in parallel with the optical axis 20. To shift the focus at the wide-angle end, the zoom motor 82 is driven at a smaller rotational amount than zooming from a wide-angle end to a second zoom position shifted by one step in a telephoto direction. It is likely that there occurs a deviation in movement upon zooming from a present zoom position to a second zoom position if the focus is simply shifted at the wide-angle end, because of backlash in the gear train 83 or play between the male and female helicoid threads 30 and 32. Thus, it is predetermined in operation to return the zoom optical system at first to the wide-angle end ready position of FIG. 3 before shifting the focus at the wide-angle end.

Figure 10:
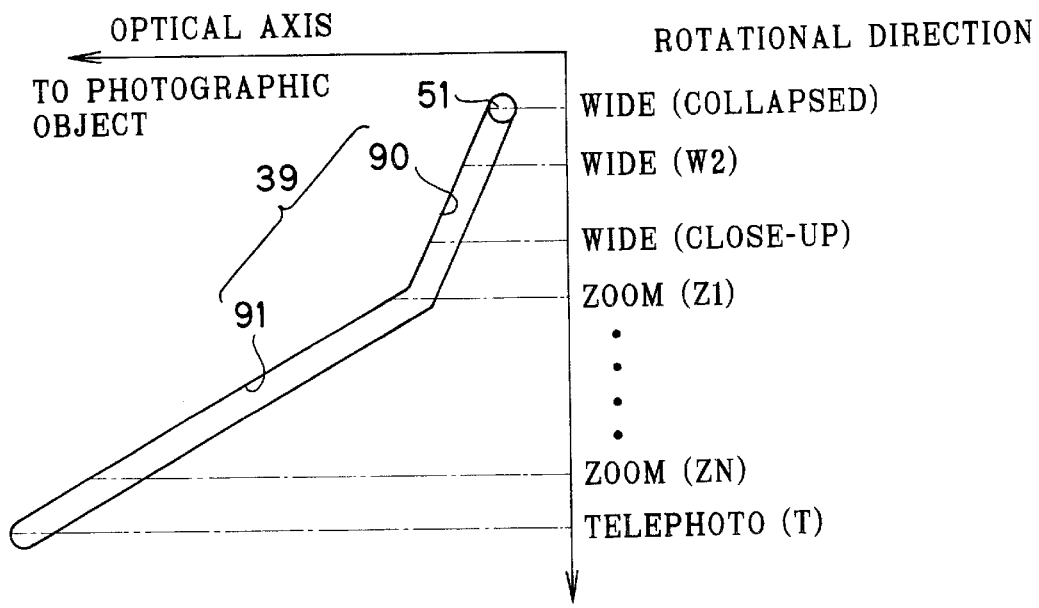
FIG. 10 is an explanatory view illustrating a cam groove for an inner intermediate barrel and having first and second groove portions.

In FIG. 10, the first cam groove 39 includes a first groove portion 90 and a second groove portion 91. The first groove portion 90 moves the cam follower pin 51 in parallel with the optical axis 20 according to a rotating amount of the outer intermediate barrel 15 in response to rotation of the zoom motor 82 from the collapsed position to the wide-angle end W2 where an infinite far distance is focused. The second groove portion 91 moves the cam follower pin 51 according to a rotating amount of the outer intermediate barrel 15 in response to rotation of the zoom motor 82 from a second zoom position Z1 to the telephoto end T, the second zoom position Z1 being so determined that the zoom optical system is zoomed in by one step from the wide-angle end. The first groove portion 90 has an inclined shape different from that of the second groove portion 91 as viewed along the optical axis 20.

Figure 11:
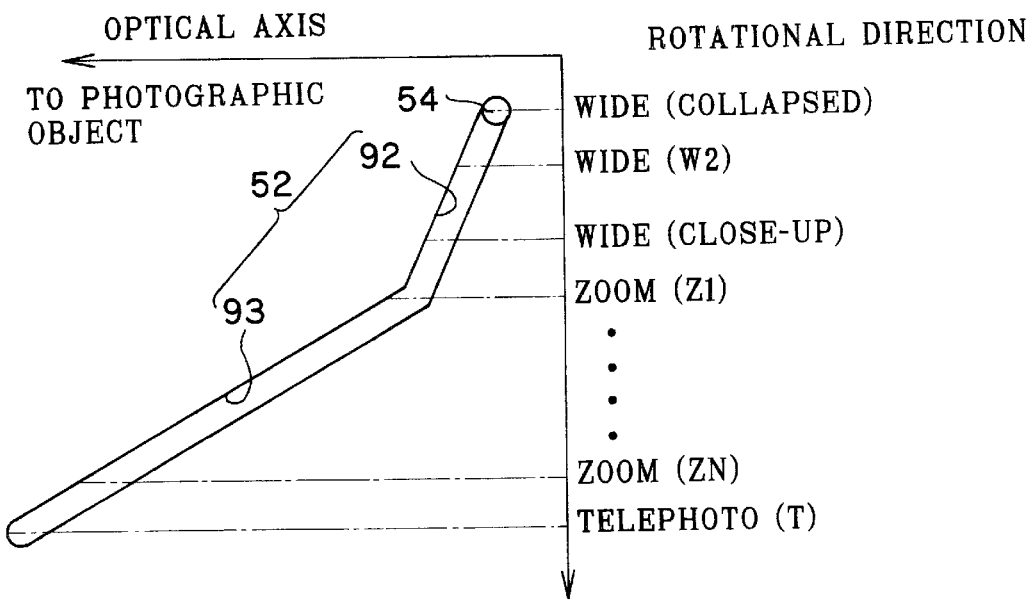
FIG. 11 is an explanatory view illustrating a cam groove for an inner intermediate barrel and having first and second groove portions.

In FIG. 11, the second cam groove 52 includes a first groove portion 92 and a second groove portion 93. The first groove portion 92 shifts the cam follower pin 54 along the optical axis 20 according to a rotational amount of the inner intermediate barrel 12 while the zoom motor 82 rotates from the collapsed position to the wide-angle end W2 in focusing to the infinite far distance. The second groove portion 93 shifts the cam follower pin 54 along the optical axis 20 according to a rotational amount of the inner intermediate barrel 12 while the zoom motor 82 rotates from the second zoom position Z1 to the telephoto end T. The first groove portion 92 has an inclination or shifting amount different from that of the second groove portion 93 as viewed in parallel with the optical axis 20.

The first groove portion 90 of the first cam groove 39 and the first groove portion 92 of the second cam groove 52 are inclined. However, the first groove portion 90 or 92 may be formed to extend exactly in a rotational direction without an inclination, or on a plane that is perpendicular to the optical axis 20. For focusing at the wide-angle end, the outer intermediate barrel 15 is moved forwards with reference to the stationary barrel 16 according to the lead of the male and female helicoid threads 30 and 32. The inner intermediate barrel 12 and the movable barrel 11 are not moved with reference to the outer intermediate barrel 15. In the present embodiment, a shifting amount according to the first groove portion 90 of the first cam groove 39 is equal to that according to the first groove portion 92 of the second cam groove 52. However, a shifting amount according to the first groove portion 90 of the first cam groove 39 may be different from that according to the first groove portion 92 of the second cam groove 52.

An amount of shifting the focus at the wide-angle end is determined as a combination of lead of the male and female helicoid threads 30 and 32 of the outer intermediate barrel 15 and the combined shifts of the first groove portion 90, 92 of the cam grooves 39 and 52 in parallel with the optical axis 20.

ROM 62 in FIG. 5 stores first data, used at the time of the wide-angle end, for driving the zoom motor 82 according to an object distance obtained from the rangefinding unit 63. Also, ROM 62 stores second data, used at the time of a zoom position different from the wide-angle end, for driving the focusing motor 28 for the middle lens group 18 according to an object distance. There are plural sets of the second data corresponding to the plural zoom positions. Thus, the combination of ROM 62 and the focusing and zoom motors 28 and 82 determines positions of the front lens group 17, the middle lens group 18 and the rear lens group 19 for any of the zoom positions.

The operation of the embodiment is described now. While the power switch remains turned off, the zoom optical system is in the collapsed position of FIG. 2. When the power switch is turned on, the controller 60 drives the focusing motor 28 to move the middle lens group 18 forwards toward the photographic field. The intercepting plate 77 is detected by the photo sensor 78 described with FIG. 6, to stop the focusing motor 28. Therefore, the middle lens group 18 is in the original position. The zoom lens device 10 is set in the wide-angle end ready position illustrated in FIG. 3. Rotation of the focusing motor 28 is also transmitted to the lens barrier mechanism, in which the lens barrier plates 66 and 67 are moved to their open position. Thus, the photographing opening 11a of the movable barrel 11 is opened.

The shutter release button is depressed. At first, the controller 60 operates the photometric unit 64 and the rangefinding unit 63 in response to halfway depression of the shutter release button. When the shutter release button is fully depressed, the controller 60 reads a rotating amount for the zoom motor 82 from ROM 62, the rotating amount being according to an object distance obtained from the rangefinding unit 63. The controller 60 drives the zoom motor 82 by monitoring the photo sensor 87 so as to rotate the zoom motor 82 by the rotating amount being read. Therefore, the movable barrel 11, the inner intermediate barrel 12 and the outer intermediate barrel 15 are moved forwards. When the rotating amount according to the object distance is obtained from a signal of the photo sensor 87, driving of the zoom motor 82 is discontinued to complete a shift of focus. The middle lens group 18 remains in the original position.

According to object brightness obtained by the photometric unit 64, the shutter mechanism 26 is controlled to take an exposure. After the exposure, the zoom motor 82 is rotated in a backward direction reverse to the first forward direction by an amount according to the rotating amount, and returned to the state of FIG. 2. Thus, a shift of the focus at the wide-angle end is effected between the infinity focused state of FIG. 8 and the close-up focused state of FIG. 9.

When the zoom button is operated for zooming in the telephoto direction, the controller 60 drives the zoom motor 82 in monitoring an output from the contact point pattern 68. When the controller 60 detects a zoom position from the contact point pattern 68 after the zooming operation, the zoom motor 82 is stopped. If the zoom lens device comes to a second zoom position one step after the wide-angle end, a rotating amount of the zoom motor 82 is higher than that required for focusing on to a close-up object at the wide-angle end.

For zoom positions different from the wide-angle end, the controller 60 responds to full depression of the shutter release button, and reads a rotating amount for the focusing motor 28 from ROM 62, the rotating amount being according to the object distance obtained by the rangefinding unit 63 and the present zoom position. The focusing motor 28 is driven according to the rotating amount. The middle lens group 18 is moved from the original position toward the focal plane. After the movement, the shutter mechanism 26 is driven as described above to take an exposure. Then the controller 60 drives the focusing motor 28 to move back the middle lens group 18 to the original position.

It is also possible that, in order to set a zoom position different from the wide-angle end by driving the zoom motor 82, the focusing motor 28 is driven to move the middle lens group 18 to a position focused to an infinite far distance for each of the zoom positions. For this operation, an infinite far distance position of the middle lens group 18 is determined the closest to a focal plane from the original position. The middle lens group 18 is moved forwards toward the object according to an object distance for focusing operation. After an exposure is taken, then the middle lens group 18 is moved to the infinite far distance position again.

Note that the structure for combined movement of all the lens groups includes the movable barrel 11, the inner intermediate barrel 12, the rectilinear key frame 13, the rectilinear barrel 14, the outer intermediate barrel 15, the stationary barrel 16 and the zoom motor 82. The structure for moving the middle lens group includes the focusing motor 28 and the screw rod 70.

In the above embodiment, the focusing and zoom motors 28 and 82 are DC motors. Alternatively, the focusing and zoom motors 28 and 82 can be stepping motors. As drive pulses of suitable numbers can be sent to the focusing and zoom motors 28 and 82, the rotary encoders 81 and 88 can be eliminated in the zoom lens device.

In the above embodiment, the zoom optical system has the three lens groups. However, a zoom optical system may include two lens groups or four or more lens groups. To set a zoom position different from the wide-angle position, one or two lens groups may be moved among the plural lens groups. Also, the drive unit 34 may have a construction other than that according to the above embodiment.

Figure 12:
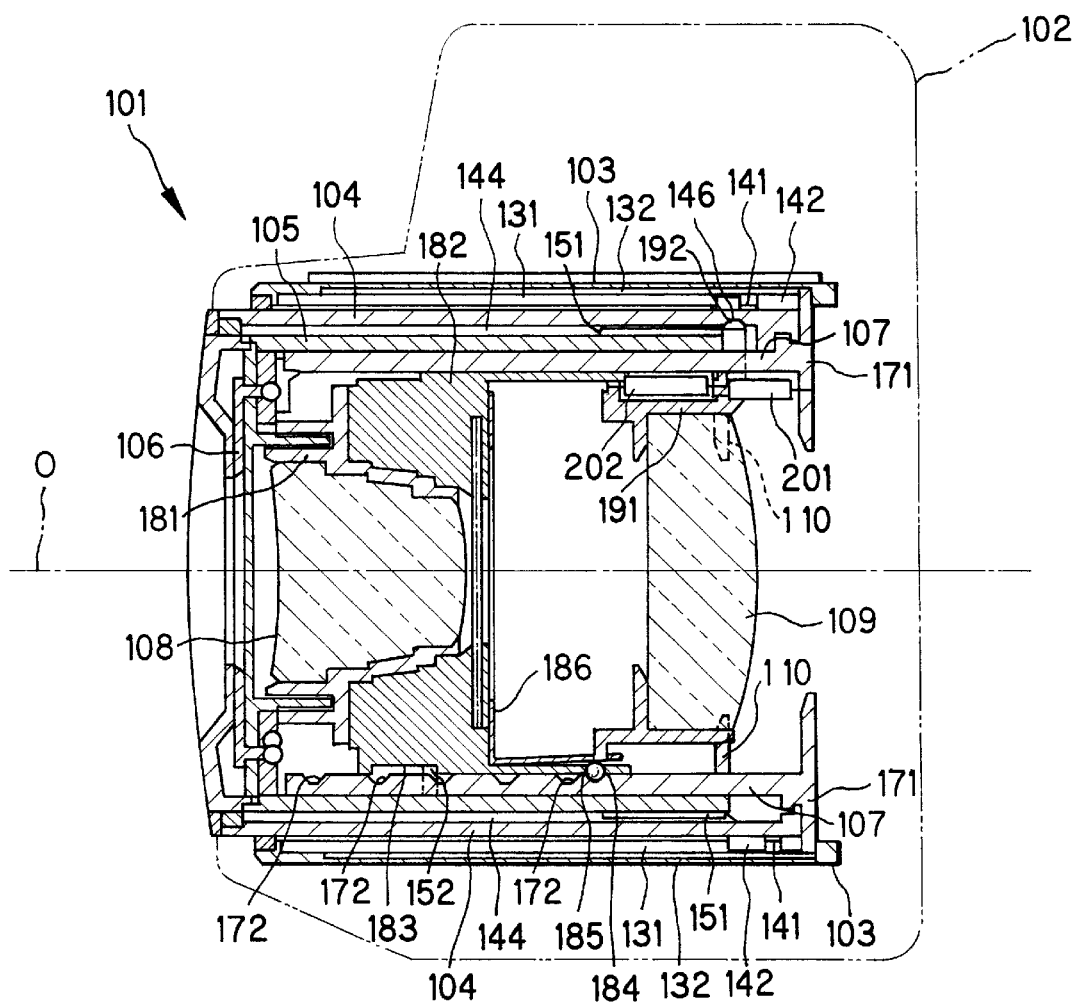
FIG. 12 is a cross section illustrating a cam groove for a movable barrel and having first and second groove portions.
Figure 13:
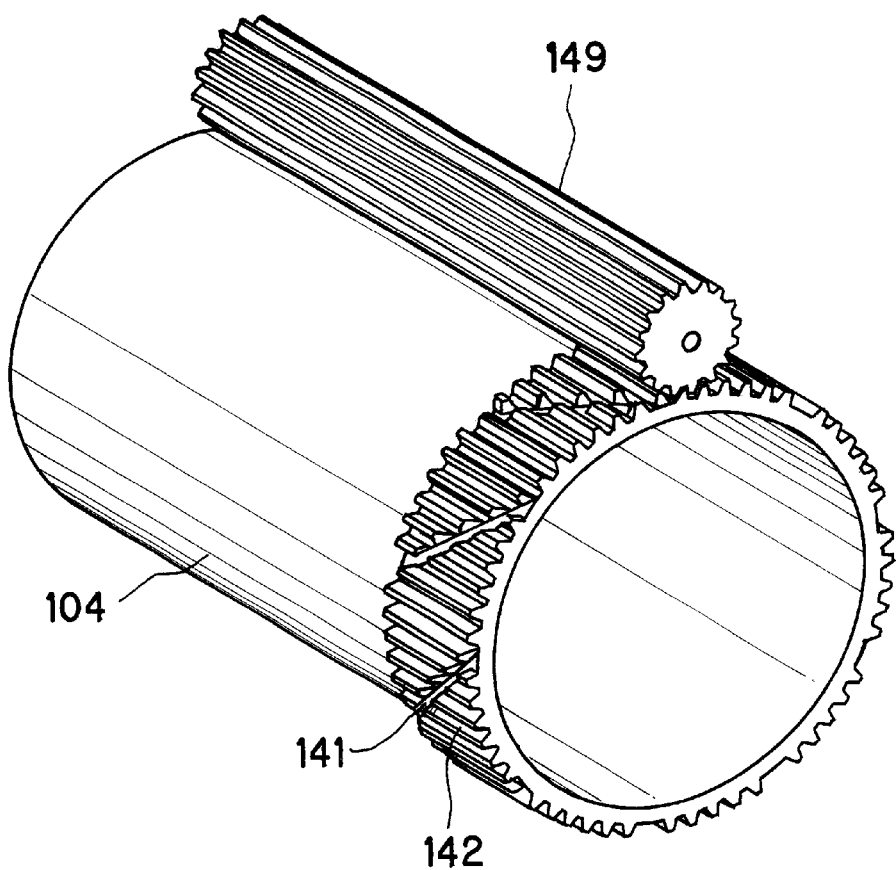
FIG. 13 is a perspective illustrating an intermediate barrel and a gear.

Another preferred embodiment is described now. In FIG. 12, a zoom lens device 101 is illustrated. The zoom lens device 101 is incorporated in a camera, and includes an intermediate barrel 104 and a movable barrel 105, both of which are movable forwards and backwards with respect to a camera body 102. The intermediate barrel 104 has two open ends. A stationary barrel 103 is formed in the camera body 102, and receives the intermediate barrel 104. There are a male helicoid thread 141 and gear teeth 142 in a rear portion of the peripheral face of the intermediate barrel 104. In FIG. 13, the male helicoid thread 141 is formed like a spiral in the rear portion of the peripheral face of the intermediate barrel 104. The gear teeth 142 are formed between plural teeth or ridges in the periphery of the intermediate barrel 104.

A female helicoid thread 131 constituting the first helicoid mechanism is formed with the inner face of the stationary barrel 103, and helically coupled with the male helicoid thread 141. A gear 149 in an axially long shape is disposed beside the intermediate barrel 104, and meshed with the gear teeth 142. When the gear 149 rotates, the gear teeth 142 cause the intermediate barrel 104 to rotate about the optical axis O. Thus, the intermediate barrel 104 moves relative to the stationary barrel 103 along the optical axis O with the helical coupling between the female and male helicoid threads 131 and 141 while the intermediate barrel 104 rotates.

The intermediate barrel 104 accommodates the movable barrel 105, which is movable in a direction of the optical axis O. The movable barrel 105 is disposed coaxial with the intermediate barrel 104 at the optical axis O. A lens barrier 106 is disposed at a front end of the movable barrel 105 in an openable manner. A male helicoid thread 151 is formed with a rear portion of the movable barrel 105, and constitutes a second helicoid mechanism. Female helicoid thread grooves 144 in the second helicoid mechanism are formed in an inner surface of the intermediate barrel 104, and are helically coupled with the male helicoid thread 151.

A rectilinear barrel 107 supports the movable barrel 105 disposed thereon. The movable barrel 105 is prevented from rotating about the optical axis O, and allowed to move along the optical axis O. When the intermediate barrel 104 rotates, the movable barrel 105 moves relative to the intermediate barrel 104 along the optical axis O by means of the helical coupling of the female and male helicoid threads 144 and 151.

The rectilinear barrel 107 is contained in the movable barrel 105. A key 171 is formed with a rear portion of the rectilinear barrel 107. A rectilinear groove 132 is formed in an inner surface of the stationary barrel 103, and receives the key 171. Thus, the rectilinear barrel 107 is prevented from rotating about the optical axis O, and kept movable along the optical axis O rectilinearly.

A rear portion of the rectilinear barrel 107 is engaged with the intermediate barrel 104 in a state of allowing the intermediate barrel 104 to rotate. According to the movement of the intermediate barrel 104 along the optical axis O, the rectilinear barrel 107 moves in a rectilinear manner without rotation.

A zoom optical system is constituted by a front lens group 108 and a rear lens group 109, which are disposed inside the rectilinear barrel 107.

A rear lens holder 191 supports the rear lens group 109, and is engaged with the inside of the rectilinear barrel 107 in a slidable manner in parallel with the optical axis O. A cam follower pin 192 projects from the rear lens holder 191 in a direction away from the optical axis O. A cam groove 146 is formed in the inside of the intermediate barrel 104, constitutes a cam mechanism with the cam follower pin 192, and receives insertion of the cam follower pin 192 inserted in gaps of the rectilinear barrel 107 and the movable barrel 105. When the intermediate barrel 104 rotates and moves, the rear lens group 109 is moved along the optical axis O according to the cam groove 146. Details of the cam groove 146 will be described below.

A front lens holder 181 supports the front lens group 108. A shutter unit 182 is secured to the front lens holder 181, and movable together. The shutter unit 182 is kept slidable in the rectilinear barrel 107 along the optical axis O.

A transmission recess 183 or groove is formed in a lateral wall of the shutter unit 182, and extends in parallel with the optical axis O. A transmission projection 152 projects from the inside of the movable barrel 105, and inserted in the transmission recess 183 to constitute a transmission mechanism. The shutter unit 182 and the front lens group 108 are movable relative to the movable barrel 105 according to a distance associated with the range of the transmission recess 183.

A retention ball 184 is provided on the shutter unit 182, and retains the front lens group 108 with the intermediate barrel 104 to move together. A through hole 185 is formed in a rear portion of the shutter unit 182, and receives entry of the retention ball 184. Also, a spring plate 186 is secured to the shutter unit 182, and biases the retention ball 184 toward the outside of the rear portion of the shutter unit 182.

Retention notches 172 are formed in the inner wall of the rectilinear barrel 107 for retaining the retention ball 184. The retention notches 172 are arranged at a regular interval in parallel with the optical axis O.

A movable mask plate 110 is disposed in the rectilinear barrel 107, and movable with reference to the rectilinear barrel 107 in a direction of the optical axis O. A spring 201 biases the movable mask plate 110 in the backward direction. Also, a spring 202 is secured between the movable mask plate 110 and the rear lens holder 191, and biases the rear lens holder 191 in the backward direction.

Figure 14:
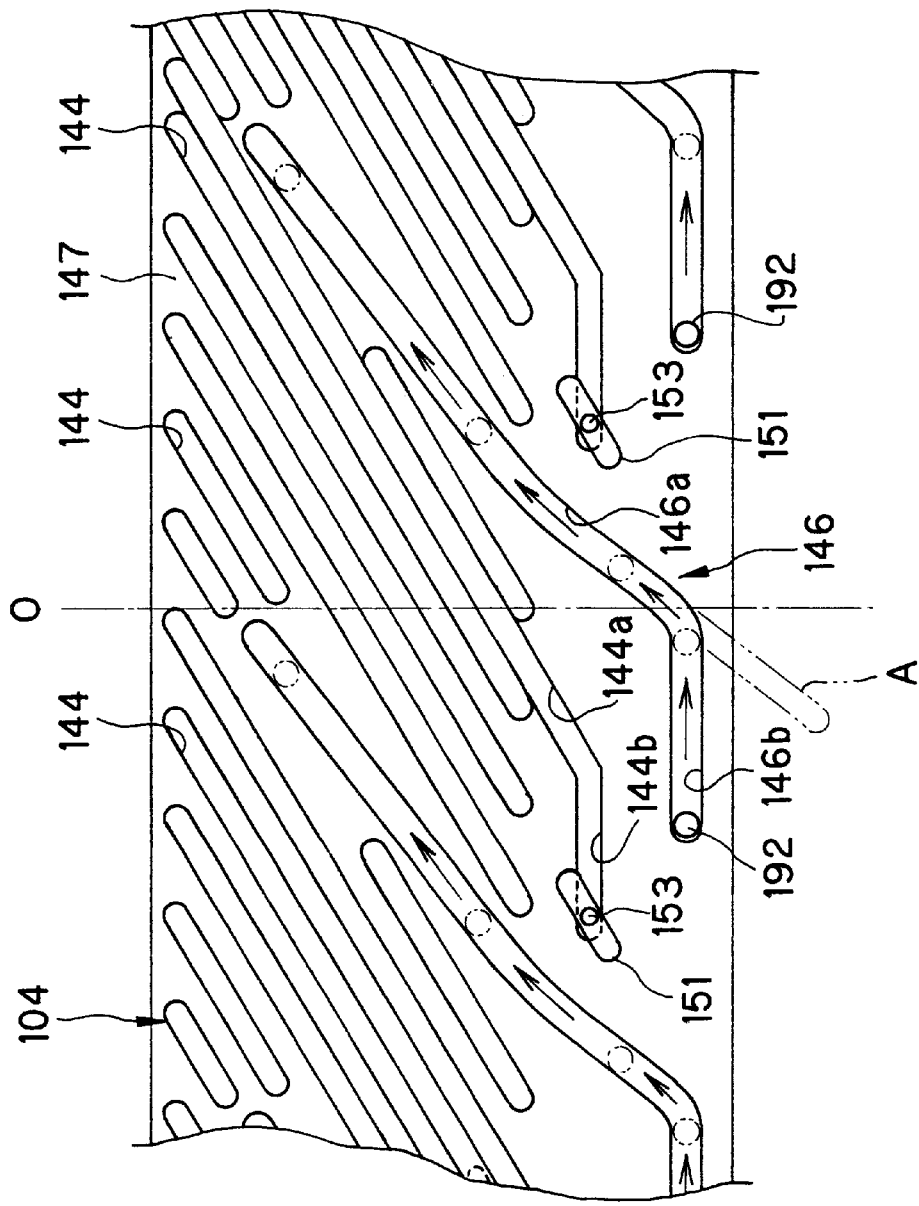
FIG. 14 is an explanatory view illustrating shapes of cam grooves in first and second cam mechanisms.

In FIG. 14, the female helicoid thread grooves 144 of the intermediate barrel 104 are illustrated.

In the drawing, an inner surface 147 of the intermediate barrel 104 is viewed in a partially developed state. A great number of the female helicoid thread grooves 144 are formed in the inner surface 147 and inclined with reference to the optical axis O. Note that, in FIG. 14, the optical axis O is defined to extend in the vertical direction. The female helicoid thread grooves 144 have a long groove shape, receive entry of the male helicoid thread 151 of the movable barrel 105, and guide the movable barrel 105 in the optical axis direction.

Part of the female helicoid thread grooves 144 are grooves with a greater depth than the remainder, and extend to the rear longer than the remainder. Rear portions of the longer female helicoid thread grooves 144 are an arc-shaped section 144b which extends on a plane perpendicular to the optical axis O. A cam section 144a extends from the arc-shaped section 144b with an inclination.

A cam follower pin 153 projects from the male helicoid thread 151 as second helicoid mechanism, and inserted in the female helicoid thread grooves 144. The cam follower pin 153 prevents the male helicoid thread 151 from dropping out of the female helicoid thread grooves 144. When the movable barrel 105 is set in a rear position as contained in the intermediate barrel 104, the cam follower pin 153 of the male helicoid thread 151 is disposed in the arc-shaped section 144b of the female helicoid thread grooves 144. See FIG. 14. Even when the intermediate barrel 104 rotates, the movable barrel 105 does not move forwards with reference to the intermediate barrel 104.

The cam groove 146 is formed in the inner wall of the inner surface 147, and operates to regulate movement of the rear lens group 109. The cam follower pin 192 of the rear lens holder 191 is inserted in the cam groove 146. In the cam groove 146, an arc-shaped section 146b extends on a plane perpendicular to the optical axis O. A cam section 146a extends from the arc-shaped section 146b, and is inclined together with the cam section 144a. The cam section 146a operates in response to rotation of the intermediate barrel 104 and moves the rear lens group 109 in parallel with the optical axis O. The arc-shaped section 146b does not move the rear lens group 109 in parallel with the optical axis O even when the intermediate barrel 104 rotates.

The cam section 146a has a gradient higher than the cam section 144a. The rear lens group 109 is movable relative to the intermediate barrel 104 at a higher amount than the movable barrel 105.

When the movable barrel 105 is set and contained inside the intermediate barrel 104, the rear lens group 109 does not move with reference to the intermediate barrel 104 even when the intermediate barrel 104 rotates, because the cam follower pin 192 of the rear lens holder 191 is located in the arc-shaped section 146b of the cam groove 146.

The operation of the zoom lens device of the embodiment is described.

In FIG. 12, the intermediate barrel 104 is contained inside the stationary barrel 103 when in a state set at the wide-angle end. The movable barrel 105 is contained inside the intermediate barrel 104. When the zoom button of the camera body 102 is operated, the intermediate barrel 104 is rotated about the optical axis O in the forward direction by rotation of the gear 149. The coupling of the female and male helicoid threads 131 and 141 moves the intermediate barrel 104 forwards along the optical axis O with reference to the stationary barrel 103.

The cam follower pin 192 of the rear lens holder 191 is located in the arc-shaped section 146b of the cam groove 146. Even if the intermediate barrel 104 rotates, the rear lens group 109 does not move relative to the intermediate barrel 104. Thus, the rear lens group 109 moves together with the intermediate barrel 104 in parallel with the optical axis O.

The cam follower pin 153 of the male helicoid thread 151 in the movable barrel 105 is located in the arc-shaped section 144b of the female helicoid thread grooves 144. Even when the intermediate barrel 104 rotates, the movable barrel 105 does not move relative to the intermediate barrel 104. Thus, the movable barrel 105 moves together with the intermediate barrel 104 along the optical axis O. The shutter unit 182 and the front lens group 108 move along the optical axis O with the intermediate barrel 104.

Consequently, the interval between the front and rear lens groups 108 and 109 remains unchanged before the movable barrel 105 moves forwards by a certain amount from the wide-angle end relative to the intermediate barrel 104. The front and rear lens groups 108 and 109 move together with the intermediate barrel 104 in parallel with the optical axis O before being set to a predetermined zoom position. The combined advance of the front and rear lens groups 108 and 109 effects focusing.

Figure 15:
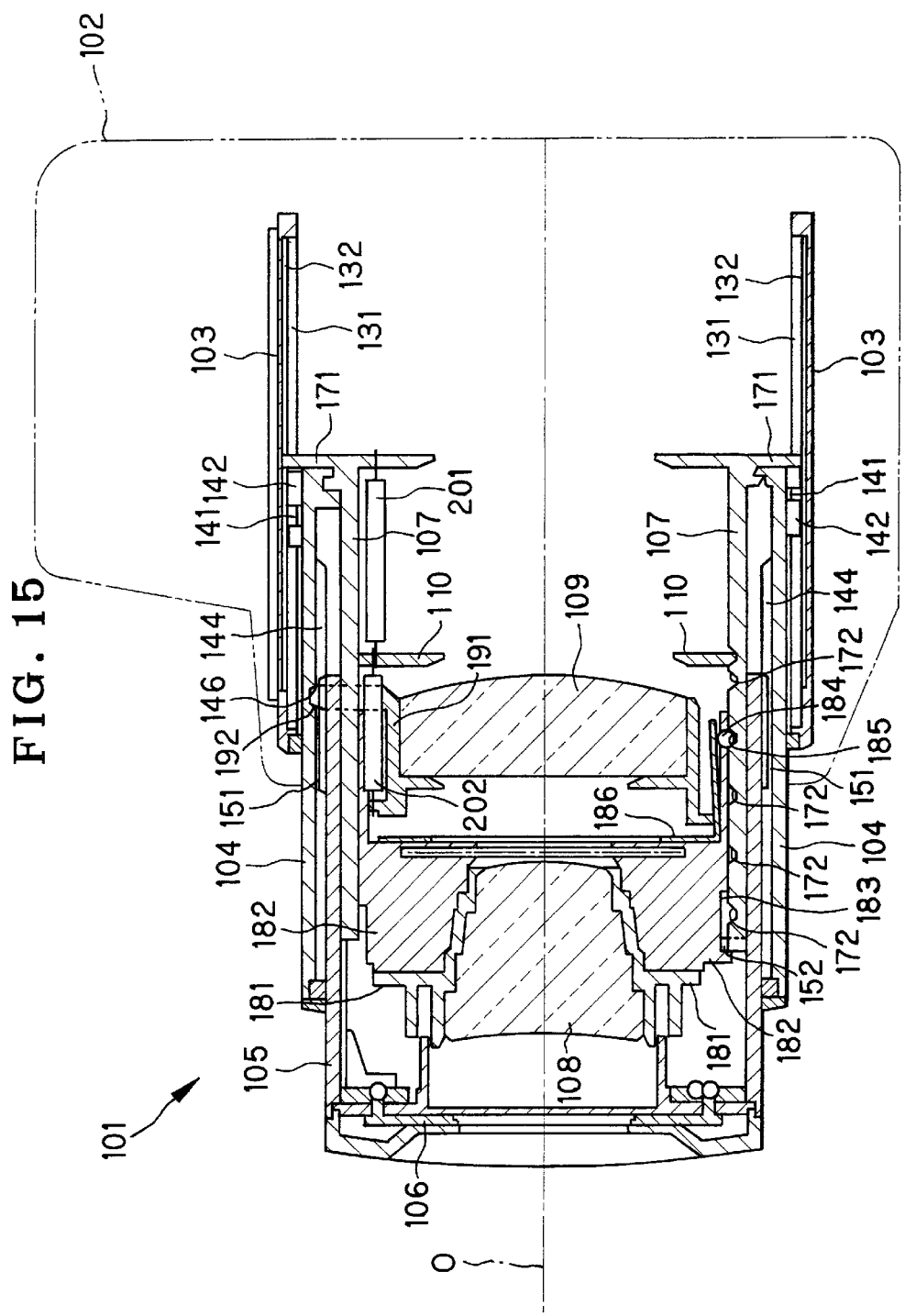
FIG. 15 is a cross section illustrating the zoom lens device in which the intermediate barrel has been moved forwards for zooming.

Furthermore, the intermediate barrel 104 rotates in the forward direction. In FIG. 15, the transmission projection 152 comes in contact with a front edge of the transmission recess 183 in the shutter unit 182, and pushes the shutter unit 182 and the front lens group 108 in the forward direction. The retention ball 184 of the shutter unit 182 becomes disengaged from the retention notches 172 in the rectilinear barrel 107. The shutter unit 182 and the front lens group 108 move in the optical axis direction together with the movable barrel 105.

The intermediate barrel 104 rotates further in the forward direction. The cam follower pin 192 comes into the cam section 146a of the cam groove 146. The rear lens group 109 moves forwards relative to the intermediate barrel 104 according to the inclination of the cam section 146a.

This forward rotation of the intermediate barrel 104 moves the rear lens group 109 along the optical axis O according to the shape of the cam groove 146 upon movement of the intermediate barrel 104. The front lens group 108 moves along the optical axis O together with the movable barrel 105. Separate movements of the front and rear lens groups 108 and 109 cause the zooming operation.

The shutter release button of the camera body 102 is depressed in the state of FIG. 15. The intermediate barrel 104 rotates in the backward direction about the optical axis O at an amount according to an object distance. Thus, the intermediate barrel 104 moves backwards relative to the stationary barrel 103 in parallel with the optical axis O by means of the helical coupling between the female and male helicoid threads 131 and 141.

Figure 16:
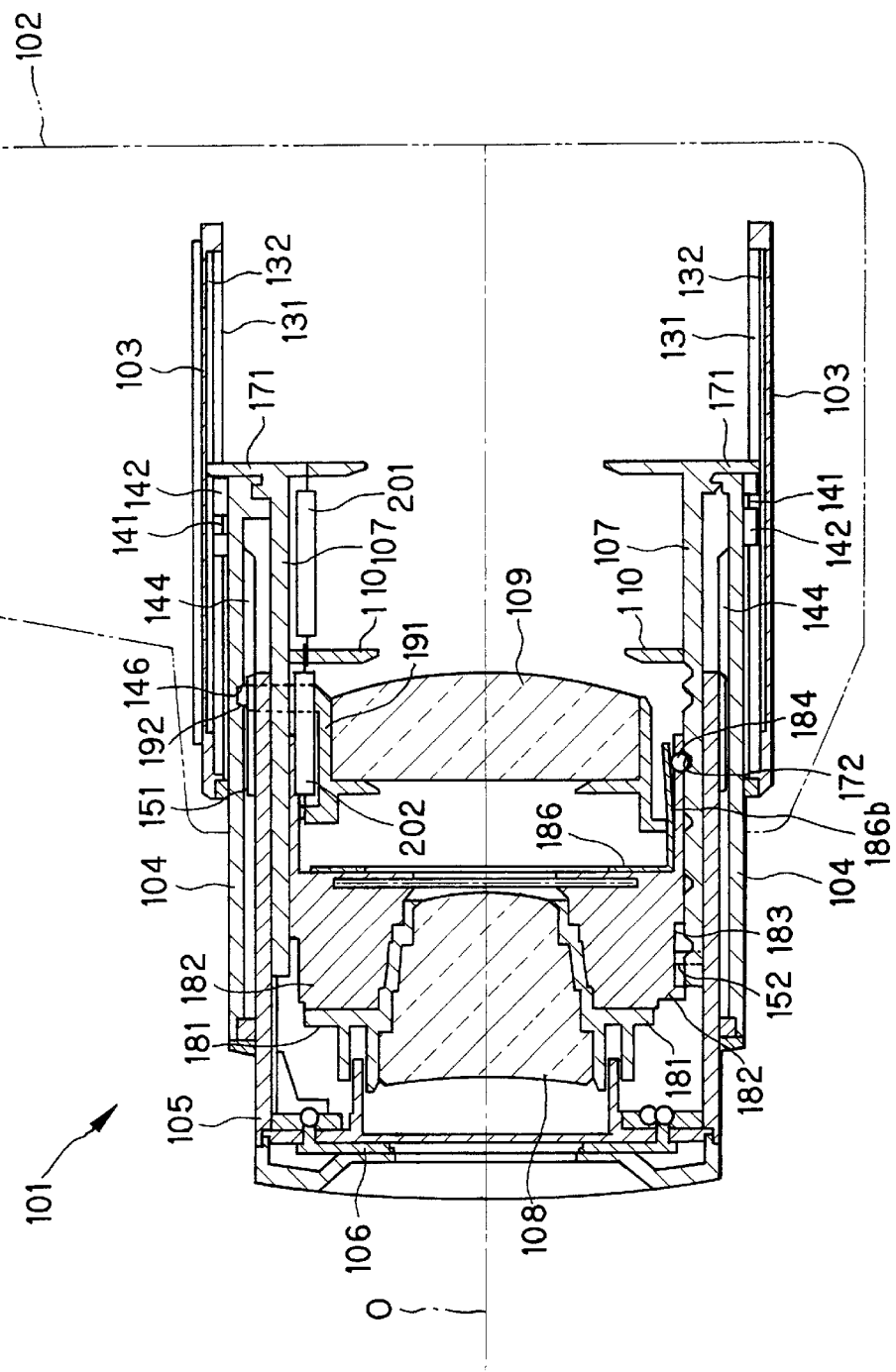
FIG. 16 is a cross section illustrating the zoom lens device in which the intermediate barrel has been moved backwards for focusing.

In FIG. 16, the rear lens group 109 is moved by the backward movement of the intermediate barrel 104 according to the shape of the cam groove 146 along the optical axis O. The movable barrel 105 moves along the optical axis O relative to the intermediate barrel 104 by means of the helical coupling of the female and male helicoid threads 144 and 151.

As the retention ball 184 of the shutter unit 182 is fitted in one of the retention notches 172 of the rectilinear barrel 107 and pressed by the spring plate 186, the retention ball 184 can be kept positioned at the retention notch 172 in an immovable manner. The shutter unit 182 moves together with the rectilinear barrel 107. The front lens group 108 fixed on the shutter unit 182 moves together with the rectilinear barrel 107 and the intermediate barrel 104.

Note that, instead of the retention notches 172 and the retention ball 184, it is possible to dispose plural balls or projections in the rectilinear barrel 107 and to form one notch in the shutter unit 182 for retention of one of the balls or projections.

The intermediate barrel 104 rotates backwards according to the object distance. Therefore, the rear lens group 109 is moved in the optical axis direction according to the movement of the intermediate barrel 104 and the shape of the cam groove 146. The front lens group 108 can be moved in the optical axis direction according to the movement of the intermediate barrel 104.

Therefore, barrel movement is possible in a manner different from that at the time of zooming with the front lens group 108. The zoom optical system can be focused appropriately according to the separate advance type of barrel movement.

Note that the term "separate advance type" of the barrel movement represents barrel movement with changes in an interval between the front and rear lens groups 108 and 109. The term "combined advance type" of the barrel movement represents barrel movement without changes in the interval between the front and rear lens groups 108 and 109.

Figure 17:
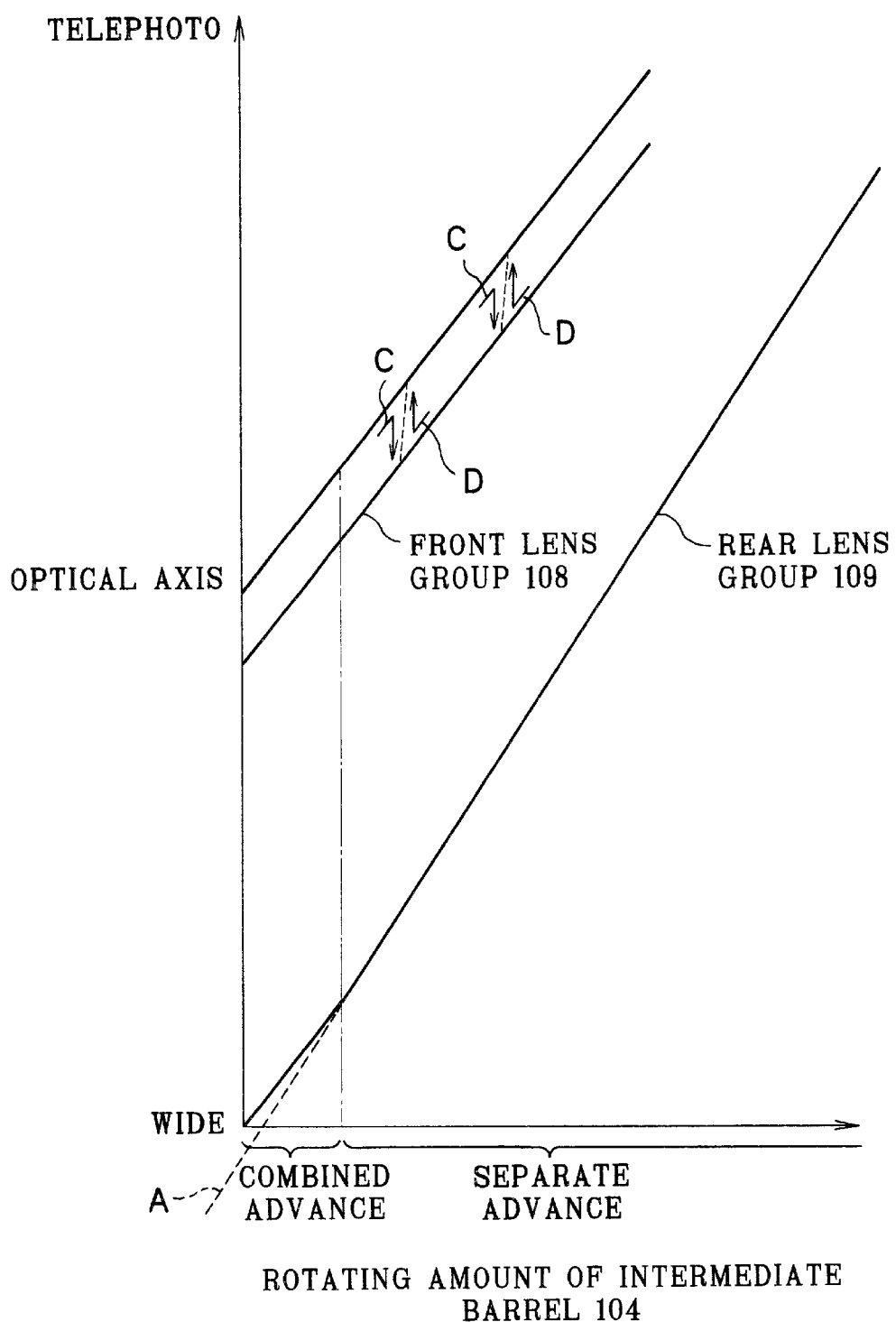
FIG. 17 is a graph illustrating relationships between a rotating amount of the intermediate barrel and positions of front and rear lens groups along an optical axis.

FIG. 17 illustrates a relationship in the zoom lens device 101 between a rotating amount of the intermediate barrel 104 and positions of the front and rear lens groups 108 and 109.

In FIG. 17, the rear lens group 109 is set at the wide-angle end. The front and rear lens groups 108 and 109 move together in the manner of the combined advance in rotation of the intermediate barrel 104. In contrast, if the rear lens group 109 is set in a position forward from the wide-angle end, the front and rear lens groups 108 and 109 move individually in the manner of the separate advance in rotation of the intermediate barrel 104.

Should a zoom lens device have only the separate advance type of movement for both zooming and focusing of the front and rear lens groups 108 and 109, the rear lens group 109 must be moved more backwards as indicated by the broken line A in FIG. 17. This would require the cam groove 146 to extend in a manner indicated by the broken line A in FIG. 14. The zoom lens device 101 must have a considerably large size.

Should the combined advance be used solely to focus the zoom optical system having the front and rear lens groups 108 and 109, an amount of barrel movement will be too high on the telephoto side, and causes the zoom optical system to have an excessive large size in a camera.

Therefore, both the combined advance and separate advance are used to operation of zooming and focusing the front and rear lens groups 108 and 109. This is effective in proper focusing without enlarging the size of the zoom lens device 101, and also in keeping a sufficient range of zooming.

In FIG. 17, the arrow C represents changes in the position of the front lens group 108 during operation of zooming and focusing in the telephoto direction. The arrow D represents changes in the position of the front lens group 108 during operation of zooming and focusing in the wide-angle direction.

It is concluded according to the invention that the combined advance type of the barrel movement is used from the wide-angle end to the predetermined zoom position for the purpose of zooming and focusing. The separate advance type of the barrel movement for the front and rear lens groups 108 and 109 is used from the predetermined zoom position and the telephoto end for the purpose of zooming and focusing.

The combination of the combined advance and the separate advance is effective in shortening ranges of movement of the front and rear lens groups 108 and 109. The zoom lens device 101 can have a small size. The combined advance is advantageously used on the wide-angle side. The separate advance is advantageously used on the telephoto side in the region between the wide-angle and telephoto ends.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A zoom lens device comprising:
   a zoom optical system, having at least first and second lens groups, for being set at one focal length between a wide-angle end where a focal length is short and a telephoto end where said focal length is long;
   a lens barrel for moving in first and second regions to move said first and second lens groups along an optical axis, said lens barrel, when in said first region, focusing said zoom optical system with a predetermined focal length kept by maintaining an interval between said first and second lens groups, and when in said second region, changing said focal length of said zoom optical system; and
   a first lens moving mechanism for focusing, which changes a focus of the zoom lens device by moving said first lens group relative to said second lens group along said optical axis when said lens barrel is in said second region, wherein the first lens moving mechanism is operable only when the lens barrel is in the second region.

2. A zoom lens device as defined in claim 1, further comprising:
   a zoom motor for moving said lens barrel;
   a focusing motor for driving said first lens moving mechanism; and
   a controller for controlling said zoom motor and said focusing motor, said controller, when said zoom optical system is set at said predetermined focal length, driving said zoom motor for focusing, and when said zoom optical system is offset from said predetermined focal length, driving said focusing motor for focusing.

3. A zoom lens device as defined in claim 2, wherein said predetermined focal length is a focal length at said wide-angle end.

4. A zoom lens device as defined in claim 3, further comprising:
   a rangefinding unit for measuring object distance;
   a memory for storing set position information of which an address is a combination of said object distance and said focal length;
   wherein said controller reads said set position information from said memory according to said object distance and said focal length, and drives said zoom motor or said focusing motor according to said set position information.

5. A zoom lens device as defined in claim 4, wherein said lens barrel effects focusing operation by rotating from a starting point of said first region toward an ending point of said first region, said starting point being at said wide-angle end, and said ending point being continuous with said second region.

6. A zoom lens device as defined in claim 5, wherein further comprising a zoom position detector for detecting said focal length where said zoom optical system is set.

7. A zoom lens device as defined in claim 6, further comprising:
   a stationary barrel for supporting said lens barrel in a rotatable and slidable manner;
   at least one movable barrel, contained in said lens barrel, movable along said optical axis, for supporting said zoom optical system in a movable manner; and
   at least one cam mechanism, actuated by rotation of said lens barrel, for moving said movable barrel along said optical axis.

8. A zoom lens device as defined in claim 7, wherein said cam mechanism has first and second cam regions associated with respectively said first and second regions.

9. A zoom lens device as defined in claim 8, wherein said cam mechanism includes:
   a cam follower pin formed to project from said movable barrel;
   a cam groove formed in said lens barrel, engaged with said cam follower pin, caused by rotation of said lens barrel to push said cam follower pin along said optical axis, said cam groove having first and second groove portions, said first groove portion constituting said first cam region, said second groove portion constituting said second cam region, and being inclined relative to a rotational direction of said lens barrel at a gradient higher than said first groove portion.

10. A zoom lens device as defined in claim 9, further comprising:
    a first measuring unit for measuring a first shifting amount of said first lens moving mechanism;
    a second measuring unit for measuring a second shifting amount of said lens barrel;
    wherein said controller stops said zoom motor or said focusing motor when respectively said first or second shifting amount comes up to a value associated with said set position information.

11. A zoom lens device as defined in claim 9, wherein said zoom position detector includes:
    a contact brush movable together with said zoom optical system; and
    a contact point pattern, including plural contact points, disposed inside said stationary barrel to extend along said optical axis, contacted by said contact brush, for generating a signal for representing said focal length.

12. A zoom lens device as defined in claim 7, wherein said lens barrel helically moves in said stationary barrel, and said movable barrel slides in said lens barrel;
    upon powering, said controller drives said zoom motor to move said lens barrel and said movable barrel to a position associated with said wide-angle end from a collapsed position disposed in a rear in said stationary barrel.

13. A zoom lens device as defined in claim 2, wherein said first lens group is disposed behind said second lens group; said first lens group includes third and fourth lens groups, said fourth lens group is disposed behind said third lens group, and driven by said focusing motor.

14. A zoom lens device comprising:
    a zoom optical system, having at least first and second lens groups, for being set at one focal length between a wide-angle end where a focal length is short and a telephoto end where said focal length is long; and
    a lens barrel for rotating in first and second regions to zoom and focus said zoom optical system, said first and second regions being defined by dividing a section to move said zoom optical system from said wide-angle end to said telephoto end, said lens barrel, when in said first region, moving said first and second lens groups with an interval between said first and second lens groups kept unchanged, and when in said second region, moving said first and second lens groups with a change in said interval, wherein said lens barrel is constructed and arranged so that rotation of the lens barrel within said first region adjusts a focus of said zoom optical system with said focal length of said wide-angle end unchanged, and rotation of the lens barrel within said second region causes both a change in said focal length and a change in focus of said zoom optical system.

15. A zoom lens device as defined in claim 14, wherein said lens barrel, when in said second region, rotates toward said telephoto end for zooming, then said lens barrel rotates toward said wide-angle end in a predetermined focusing region for focusing, and said first lens group moves at a lower speed when said lens barrel is in said focusing region than said lens barrel rotates toward said telephoto end, so as to increase an interval between said first and second lens groups.

16. A zoom lens device comprising:

at least first and second lens groups movable along an optical axis;

a first lens barrel for moving along said optical axis between a wide-angle end and a telephoto end, to zoom and focus said first and second lens groups;

a first lens moving mechanism constructed and arranged so that it is actuated while said first lens barrel moves between said wide-angle end and a predetermined zoom position so as to move said first lens group together with said first lens barrel, the first lens moving mechanism being further constructed and arranged so that it is actuated while said first lens barrel moves between said predetermined zoom position and said telephoto end so as to move said first lens group relative to said first lens barrel thereby to change a zoom value only;

a second lens moving mechanism constructed and arranged so that it is actuated while said first lens barrel moves between said wide-angle end and said predetermined zoom position so as to move said second lens group together with said first lens barrel, the second lens moving mechanism being further constructed and arranged so that it is actuated while said first lens barrel moves between said predetermined zoom position and said telephoto end so as to move said second lens group relative to said first lens barrel thereby to change both a zoom value and a focus of the zoom lens device.

17. A zoom lens device as defined in claim 16, further comprising:

a stationary barrel, disposed outside said first lens barrel, coupled helically with said first lens barrel, for keeping said first lens barrel movable along said optical axis in rotation;

a second lens barrel, disposed inside said first lens barrel, coupled helically with said first lens barrel, for sliding along said optical axis relative to said first lens barrel when said first lens barrel rotates;

a third lens barrel, disposed inside said second lens barrel, for sliding along said optical axis together with said first lens barrel;

a first lens holder, contained in said third lens barrel in a slidable manner, for holding said first lens group; and a second lens holder, contained in said third lens barrel in a slidable manner, for holding said second lens group.

18. A zoom lens device as defined in claim 17, wherein said first lens moving mechanism includes:

a groove, formed in said first lens holder, for extending along said optical axis, said groove having a first end located on a side of said telephoto end, and a second end located on a side of said wide-angle end;

a projection, formed to project from said second lens holder, engageable with said first and second ends, for being engaged with said first end when said second lens holder is moved toward said telephoto end, to slide said first lens holder in said third lens barrel, and for being engaged with said second end when said second lens holder is moved toward said wide-angle end, to slide said first lens holder in said third lens barrel;

a retention mechanism for retaining said first lens holder in said third lens barrel when said projection is between said first and second ends.

19. A zoom lens device as defined in claim 18, wherein said second lens moving mechanism includes:

a cam groove formed in said first lens barrel; and a cam pin, formed to project from said second lens holder, disposed through said third lens barrel and said second lens barrel, for being engaged with said cam groove.

20. A zoom lens device as defined in claim 19, wherein said cam groove includes:

a first portion for extending in a rotational direction of said first lens barrel to set said cam pin free from being shifted, said first portion operating when said first lens barrel moves between said wide-angle end and said predetermined zoom position;

a second portion for extending crosswise to said rotational direction of said first lens barrel to shift said cam pin, said second portion operating when said first lens barrel moves between said predetermined zoom position and said telephoto end.

* * * * *